(12) United States Patent
Amicangioli et al.

(10) Patent No.: US 11,729,107 B2
(45) Date of Patent: *Aug. 15, 2023

(54) HIGHLY DETERMINISTIC LATENCY IN A DISTRIBUTED SYSTEM

(71) Applicant: HYANNIS PORT RESEARCH, INC., Needham, MA (US)

(72) Inventors: Anthony D. Amicangioli, Newton, MA (US); Allen Bast, Sharon, MA (US); B. Joshua Rosen, Westford, MA (US); Christophe Juhasz, Carlisle, MA (US)

(73) Assignee: HYANNIS PORT RESEARCH, INC., Needham, MA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/351,521

(22) Filed: Jun. 18, 2021

(65) Prior Publication Data

US 2022/0045964 A1 Feb. 10, 2022

Related U.S. Application Data

(63) Continuation of application No. 16/988,249, filed on Aug. 7, 2020, now Pat. No. 11,088,959.

(51) Int. Cl.
*H04L 12/26* (2006.01)
*H04L 47/56* (2022.01)
(Continued)

(52) U.S. Cl.
CPC ......... *H04L 47/562* (2013.01); *G06Q 20/027* (2013.01); *G06Q 40/04* (2013.01); *H04L 47/22* (2013.01); *H04L 47/522* (2013.01)

(58) Field of Classification Search
None
See application file for complete search history.

(56) References Cited

U.S. PATENT DOCUMENTS 6,697,331 B1 2/2004 Riihinen et al.
6,996,062 B1 2/2006 Freed et al.
(Continued)

FOREIGN PATENT DOCUMENTS

EP 1968275 A1 9/2008
EP 3438830 A1 2/2019
(Continued)

OTHER PUBLICATIONS

"Configuring Queuing and Flow Control," Cisco Nexus 5000 Series NX-OS Quality of Service Configuration Guide, Release 5.2(1)N1(1) (Jan. 26, 2018).

(Continued)

*Primary Examiner* — Zewdu A Beyen
(74) *Attorney, Agent, or Firm* — David J. Thibodeau; VLP Law Group, LLP

(57) ABSTRACT

A distributed computing system, such as may be used to implement an electronic trading system, supports a notion of fairness in latency. The system does not favor any particular client. Thus, being connected to a particular access point into the system (such as via a gateway) does not give any particular device an unfair advantage or disadvantage over another. That end is accomplished by precisely controlling latency, that is, the time between when request messages arrive at the system and a time at which corresponding response messages are permitted to leave. The precisely controlled, deterministic latency can be fixed over time, or it can vary according to some predetermined pattern, or vary randomly within a pre-determined range of values.

25 Claims, 12 Drawing Sheets

(51) Int. Cl.
*G06Q 40/04* (2012.01)
*H04L 47/52* (2022.01)
*H04L 47/22* (2022.01)
*G06Q 20/02* (2012.01)

(56) References Cited

U.S. PATENT DOCUMENTS

| | | |
|---|---|---|
| 7,023,833 B1 | 4/2006 | Aiello et al. |
| 7,496,086 B2 | 2/2009 | Eckberg |
| 7,720,043 B2 | 5/2010 | Meylan et al. |
| 7,876,740 B2 | 1/2011 | Eastwood et al. |
| 7,876,751 B2 | 1/2011 | Benner et al. |
| 7,885,296 B2 | 2/2011 | Biederman et al. |
| 7,948,883 B1 | 5/2011 | Croft et al. |
| 8,923,341 B2 | 12/2014 | Barnette et al. |
| 9,652,804 B2 * | 5/2017 | Bonig .............. H04L 47/34 |
| 9,691,102 B2 | 6/2017 | Studnitzer et al. |
| 9,712,606 B2 | 7/2017 | Adolfsson et al. |
| 9,929,743 B1 | 3/2018 | Acuna-Rohter et al. |
| 10,104,148 B2 | 10/2018 | Yang et al. |
| 10,262,365 B2 | 4/2019 | Venkataraman |
| 10,417,709 B2 | 9/2019 | Hosman et al. |
| 10,467,693 B2 | 11/2019 | Studnitzer et al. |
| 10,504,183 B2 | 12/2019 | Venkataraman |
| 10,585,729 B2 | 3/2020 | Vaccaro et al. |
| 10,637,967 B2 | 4/2020 | Bonig et al. |
| 10,699,336 B2 | 6/2020 | Burkhardt et al. |
| 2003/0065974 A1 | 4/2003 | Lam et al. |
| 2003/0235209 A1 | 12/2003 | Garg et al. |
| 2004/0215753 A1 | 10/2004 | Chan et al. |
| 2004/0246897 A1 | 12/2004 | Ma et al. |
| 2007/0255855 A1 | 11/2007 | Knapp et al. |
| 2008/0069118 A1 | 3/2008 | Monier |
| 2008/0084833 A1 | 4/2008 | Picard |
| 2010/0046368 A1 | 2/2010 | Kaempfer et al. |
| 2010/0312695 A1 * | 12/2010 | Digrigoli .............. G06Q 20/40 705/39 |
| 2010/0318673 A1 | 12/2010 | Kemp et al. |
| 2011/0194409 A1 | 8/2011 | Ofelt et al. |
| 2011/0264577 A1 | 10/2011 | Winbom et al. |
| 2012/0044940 A1 | 2/2012 | Katz et al. |
| 2012/0093022 A1 | 4/2012 | Wang |
| 2012/0123925 A1 * | 5/2012 | Daley .............. G06Q 40/04 705/37 |
| 2012/0131221 A1 | 5/2012 | Foygel et al. |
| 2012/0195203 A1 | 8/2012 | Godbole et al. |
| 2012/0254007 A1 * | 10/2012 | Unetich .............. G06Q 40/04 705/37 |
| 2012/0317011 A1 | 12/2012 | Duquette |
| 2015/0078376 A1 | 3/2015 | Wisehart |
| 2015/0081508 A1 | 3/2015 | Schwall et al. |
| 2015/0195202 A1 | 7/2015 | Ogura |
| 2015/0341422 A1 | 11/2015 | Farnlof et al. |
| 2015/0356679 A1 | 12/2015 | Schmitt |
| 2016/0028637 A1 | 1/2016 | Vasseur et al. |
| 2016/0063628 A1 | 3/2016 | Kreider et al. |
| 2016/0119080 A1 | 4/2016 | Gineste |
| 2016/0294921 A1 | 10/2016 | Meng et al. |
| 2017/0127341 A1 | 5/2017 | Di et al. |
| 2017/0236203 A1 | 8/2017 | Amicangioli |
| 2018/0047099 A1 | 2/2018 | Bonig et al. |
| 2018/0167492 A1 | 6/2018 | Bonig et al. |
| 2018/0279934 A1 | 10/2018 | Wo et al. |
| 2018/0317121 A1 | 11/2018 | Liao et al. |
| 2018/0359195 A1 | 12/2018 | Shah et al. |
| 2019/0097745 A1 | 3/2019 | Mallela et al. |
| 2019/0222442 A1 | 7/2019 | Wei et al. |
| 2019/0259099 A1 | 8/2019 | Katsuyama et al. |
| 2019/0349309 A1 | 11/2019 | Bonig et al. |
| 2019/0379768 A1 | 12/2019 | Amicangioli et al. |
| 2020/0034929 A1 | 1/2020 | Rao et al. |
| 2020/0104269 A1 | 4/2020 | Pope et al. |
| 2020/0134720 A1 | 4/2020 | Katsuyama et al. |
| 2020/0167865 A1 | 5/2020 | Craig et al. |
| 2020/0169355 A1 | 5/2020 | McIlroy |
| 2020/0187274 A1 | 6/2020 | Rune et al. |

FOREIGN PATENT DOCUMENTS

| | | |
|---|---|---|
| JP | 2019-050013 A | 3/2019 |
| WO | 2012/144999 A2 | 10/2012 |
| WO | 2018/106350 A1 | 6/2018 |
| WO | 2018/183542 A1 | 10/2018 |

OTHER PUBLICATIONS

"Determinism is the new latency," Arista.com, Solution Brief (Jan. 23, 2019).
"ICON(Registered) Deterministic Packet Transport," SEL Schweitzer Engineering Laboratories (2016).
Ex-Parte Quayle Action dated Nov. 26, 2021 issued in related application (U.S. Appl. No. 16/988,043).
https://tools.ielf.org/html/draft-geng-detnet-requirements-bounded-latency-03; "Requirements of Layer 3 Deterministic Latency Service draft-geng-detnet-requirements-bounded-latency-03," (Mar. 4, 2020).
International Search Report and Written Opinion received for PCT Application No. PCT/US2021/044747, dated Dec. 9, 2021, 13 pages.
International Search Report and Written Opinion received for PCT Application No. PCT/US2021/044754, dated Dec. 23, 2021, 13 pages.
International Search Report and Written Opinion received for PCT Patent Application No. PCT/US2021/044588, dated Dec. 2, 2021, 10 pages.
International Search Report and Written Opinion received for PCT Patent Application No. PCT/US2021/044591, dated Nov. 23, 2021, 8 pages.
Qiu et al., "Hierarchy Virtual Queue Based Flow Control in LTE/SAE," 2010 Second International Conference on Future Networks, pp. 78-82 (2010).

* cited by examiner

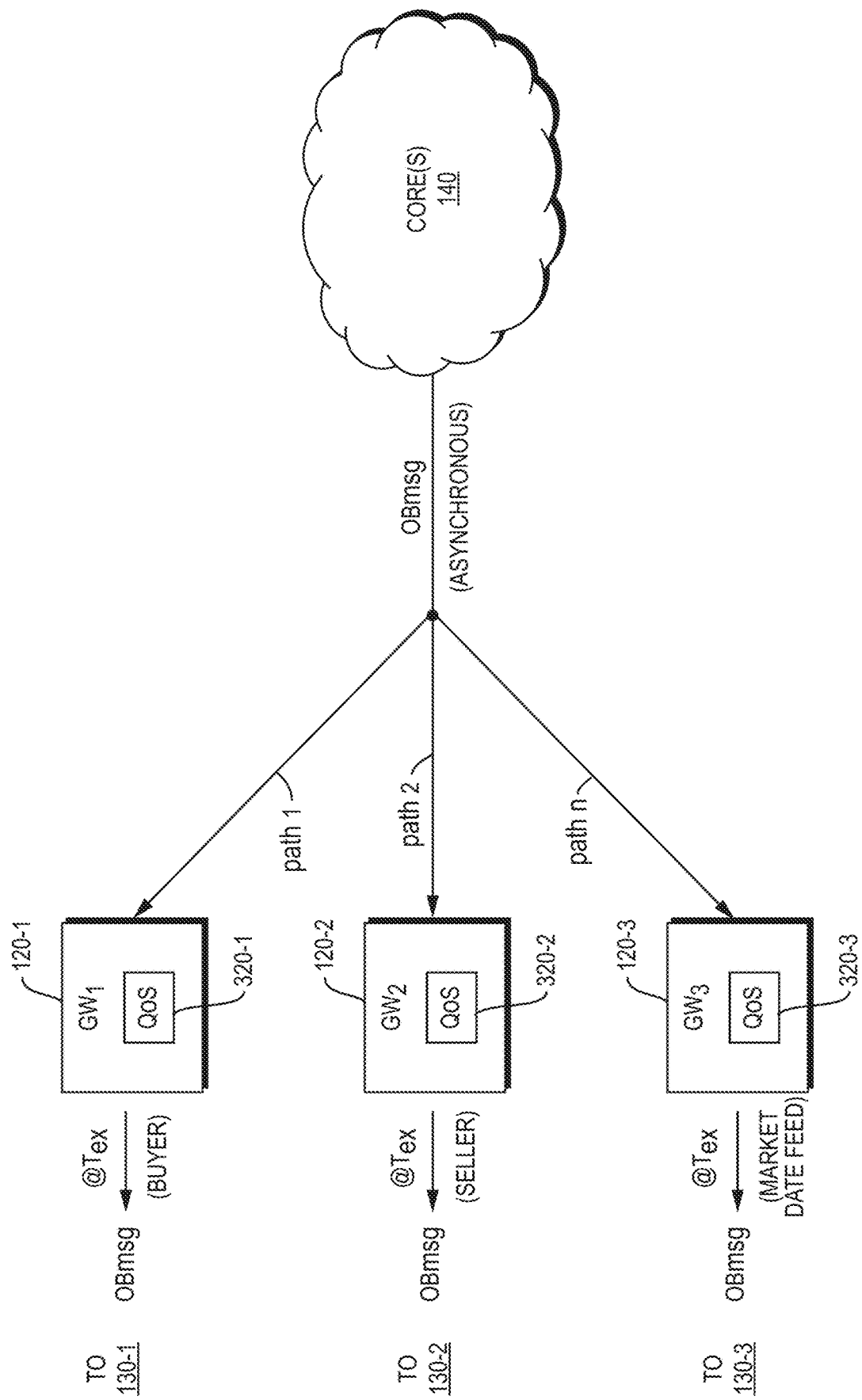

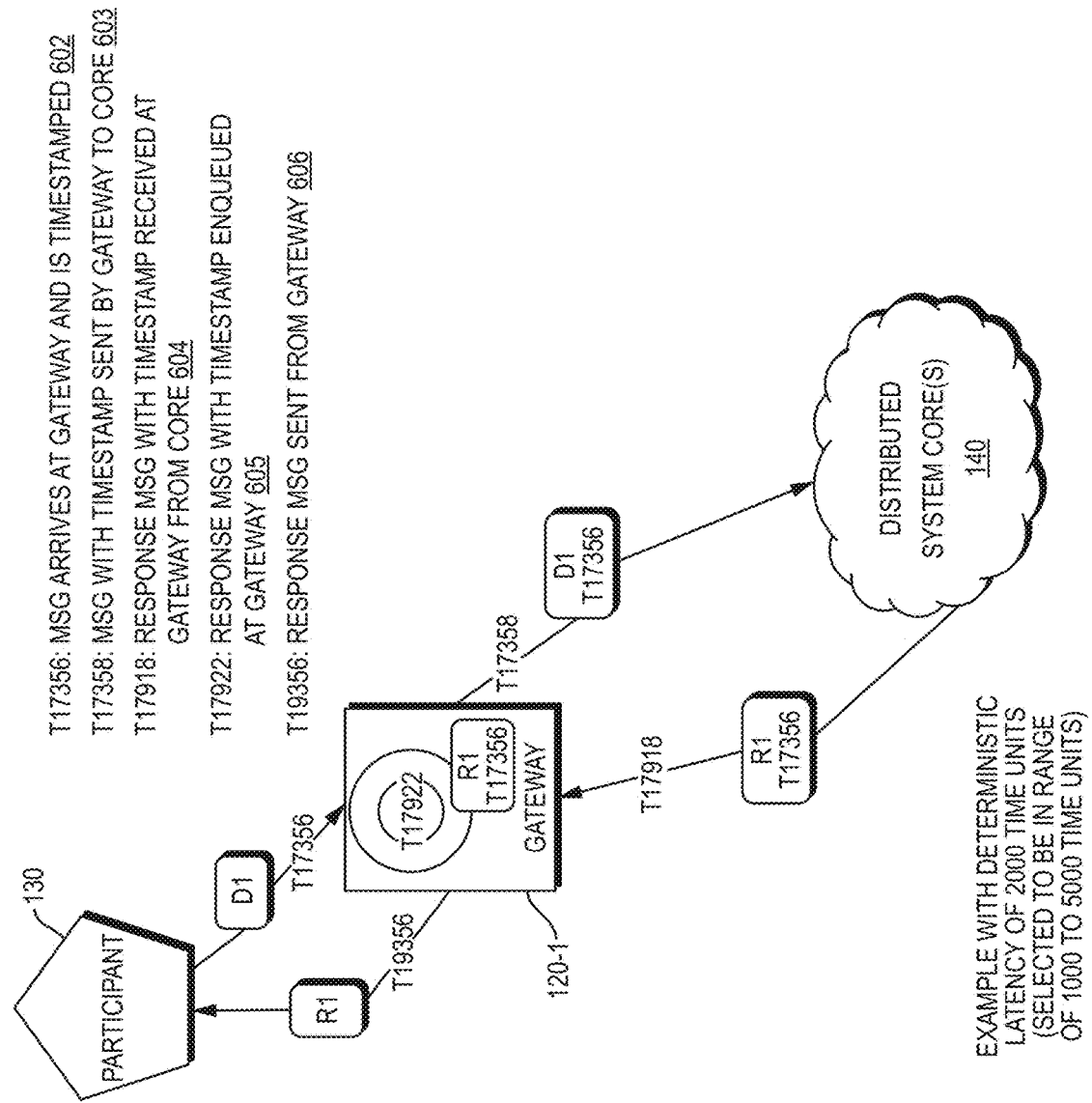

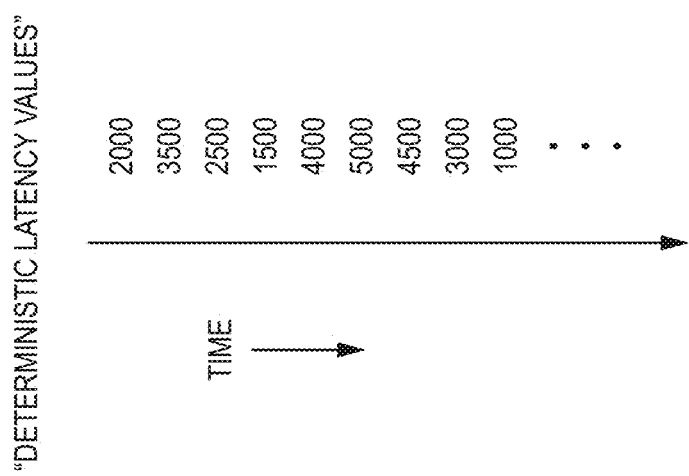

//HIGHLY DETERMINISTIC LATENCY IN A DISTRIBUTED SYSTEM

CROSS REFERENCE TO RELATED APPLICATION(S)

This patent application claims priority to a co-pending U.S. patent application Ser. No. 16/988,249 filed Aug. 7, 2020 entitled "Highly Deterministic Latency in a Distributed System", the entire contents of which are hereby incorporated by reference.

BACKGROUND

Technical Field

This patent application relates to connected devices, and more particularly to providing deterministic latency.

Background

The financial instrument trading systems currently in widespread use in the major stock exchanges allow traders to submit orders and receive confirmations, market data, and other information, electronically, via communications networks. The typical electronic trading system includes a matching engine, typically residing within a central server, and a plurality of gateways that provide access to the matching engine, as well as other distributed processors. The typical order process can be as follows: request messages representing orders are received (e.g., bid orders and/or ask orders), as sent from client devices, e.g., trader terminals operated by human users or servers executing automated trading algorithms). An order acknowledgement is then typically returned to the client devices via the gateway that forwarded the request. The exchange may perform additional processing before the order processing acknowledgement is returned to the client device.

The exchange system may also disseminate information related to the order message, either in the same form as received or otherwise, to other systems to generate market data output.

Latency, generally speaking, is the time between the input to a system and an observable response. In the context of communications systems, latency is measured as the difference in the time when a message enters or is received by the system, and the time when a corresponding response message is sent out. Latency is a particularly important consideration in high-speed electronic trading systems, where it is desirable to minimize the time it takes to execute a trade.

"Determinism is the New Latency", Solution Brief© 2019 by Arista Networks, Inc. explains that one approach to controlling latency is a "speed bump" approach, which involves introducing an approximately 350 us delay using a long length of optic fibre in the message path. Every order thus takes exactly the same amount of time to traverse the fibre. In another approach described in this document, frequently used trade data can be kept in a matching engine cache memory to minimize latency. There is also some discussion of the problems associated with trading systems that use multiple gateways to forward orders to multiple matching engines. Gateways may be allocated to participants, but that leads to another source of non-determinism: contention. It is noted that if the time required to process the order by a gateway is not deterministic, it is possible that two orders sent to the exchange in one sequence may actually be executed in a different sequence. But no solution is suggested for these problems.

U.S. Pre-grant Publication 2019/0097745 describes a communication network that uses time stamps to reduce the impact of non-deterministic delays. The state of a transmit path is estimated by observing a "non-deterministic" delay of previously transmitted packets. Transmission circuits then hold outgoing packets until packet processing circuitry provides a deterministic latency for the packet.

ICON Packet Transport, by Schweitzer Engineering Laboratories, Inc. © 2016 is an example of a networking device that provides deterministic, low latency packetization using a jitter buffer.

U.S. Pat. No. 7,496,086 is a voice network having a set of gateways that use jitter buffers to equalize delay.

U.S. Pat. No. 7,885,296 assigns timestamps to frames, and maintains synchronization among multiple timestamp counters distributed among different Physical Layer (PHY) transceivers.

U.S. Pre-grant Publication 2018/0359195 describes a network switch that uses a special type of tree data structure to identify a timestamp range for a received packet, such as may be used for streaming media in a Real-time Transport Protocol (RTP) network.

SUMMARY OF PREFERRED EMBODIMENTS

As described herein, preferred embodiments of a distributed computing system, such as an electronic trading system, provide perfectly deterministic latency. In one example implementation, an inbound message enters the system, such as request from a market participant or other client node, via one of a number of gateway nodes. The gateway node receiving the inbound message then applies an ingress time based value (which may be a "timestamp" that depends on the time of receipt) to the message. The message (including the timestamp now embedded within it) is forwarded to be processed by other nodes in the distributed system. As part of processing the message, any corresponding response message generated by other nodes in the distributed system also retains the same timestamp value (and/or constant) embedded within it.

As a corresponding response message to the request is readied to be sent back out to the participant/client by the gateway node, the response message first goes through an egress "quality of service" (QOS) shaper. The QOS shaper ensures the response message is sent out of the system only at a very precise deterministic time that depends on the ingress timestamp plus some deterministic delay.

The QOS shaper may be implemented as a "packet scheduler," which organizes outgoing messages into a set of indexed, temporary storage locations (or "buckets" associated for each discrete high precision timing interval, so that an entry is placed in a particular location in the scheduler is guaranteed to be released at the precise associated time interval.

As an alternative implementation, rather than assigning a timestamp to the arriving message, the gateway may instead directly associate the inbound message with an indexed location of the packet scheduler associated with a desired egress time. As with other implementations, this egress time is carried with the message through the system so that a corresponding response messages processed and generated by the distributed system core will be sent at the allocated time.

One advantage of the system described herein is that, unlike prior trading systems, all users of the system obtain a response with the same latency. Whether the user is a market participant, or simply a subscriber of a market data feed, every user of the system experiences the same, deterministic response time. The deterministic response time can be a fixed time value that does not vary. However, with other notions of fairness, the deterministic time can instead follow a predetermined pattern, or may be a randomly selected time that is chosen across a range of possible deterministic response times.

BRIEF DESCRIPTION OF THE DRAWINGS

Additional novel features and advantages of the approaches discussed herein are evident from the text that follows and the accompanying drawings, where:

FIG. 5 shows an asynchronous outbound message.

FIG. 6A is an example where the system provides a deterministic latency of 2000 time units selected from a deterministic range.

FIG. 7 illustrates how a set of deterministic latency values can be determined.

DETAILED DESCRIPTION OF ILLUSTRATIVE EMBODIMENT(S)

System Overview

Example embodiments disclosed herein relate to a high-speed electronic trading system that provides a market where orders to buy and sell financial instruments (such as stocks, bonds, commodities, futures, options, and the like) are traded among market participants (such as traders and brokers). The electronic trading system exhibits low latency, fairness, fault tolerance, and other features more fully described below.

The electronic trading system is primarily responsible for "matching" orders to one another. In one example, an offer to "buy" an instrument is matched to a corresponding counteroffer to "sell". The matched offer and counteroffer must at least partially satisfy the desired price, with any residual unsatisfied quantity passed to another suitable counterorder. Matched orders are then paired and the trade is executed.

Any wholly unsatisfied or partially satisfied orders are maintained in a data structure referred to as an "order book". The retained information regarding unmatched orders can be used by the matching engine to satisfy subsequent orders. An order book is typically maintained for each instrument and generally defines or otherwise represents the state of the market for that particular product. It may include, for example, the recent prices and quantities at which market participants have expressed a willingness to buy or sell.

The results of matching may also be made visible to market participants via streaming data services referred to as market data feeds. A market data feed typically includes individual messages that carry the pricing for each traded instrument, and related information such as volume and other statistics.

Figure 1:
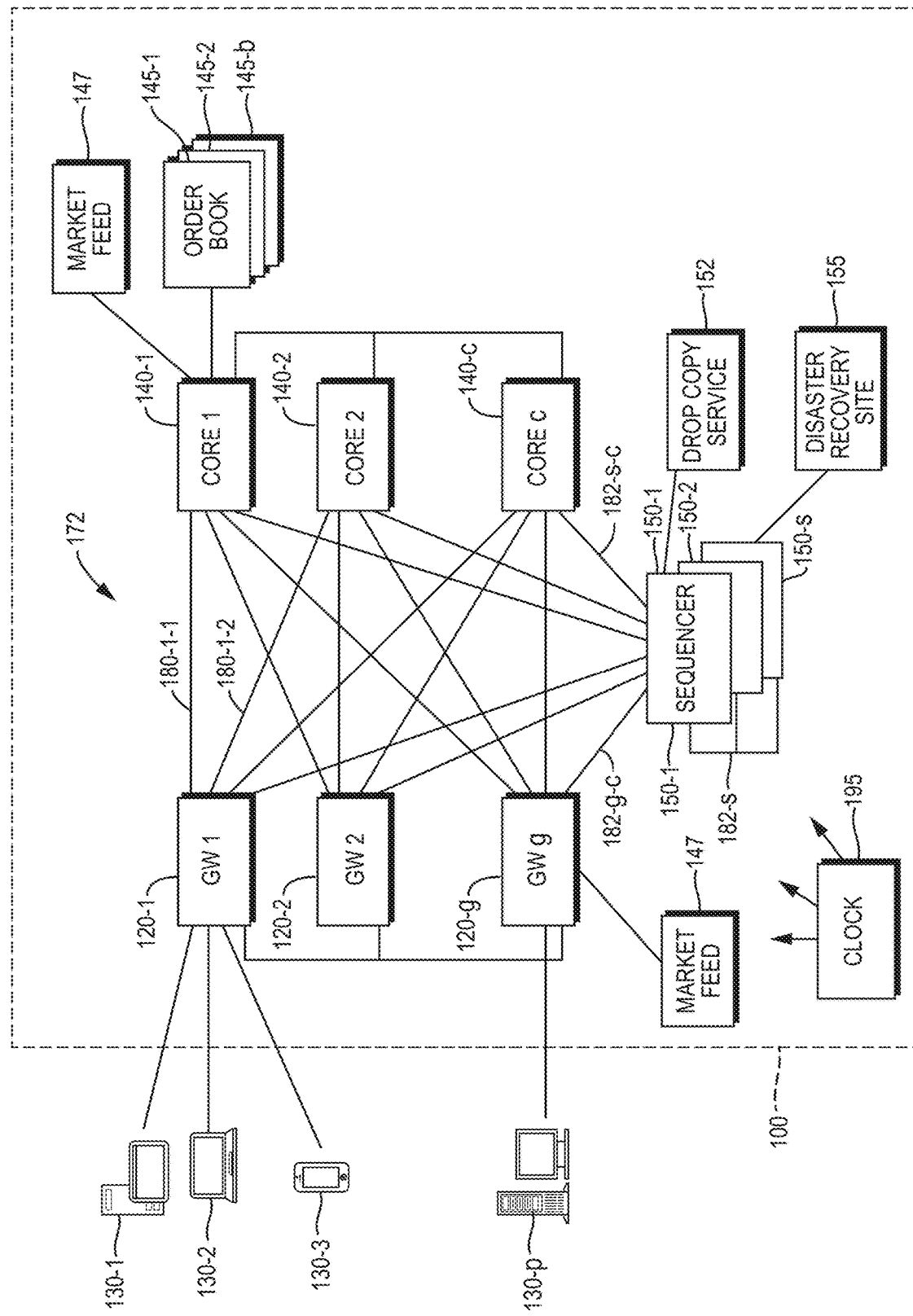
FIG. 1 is a high level block diagram of a distributed electronic trading system.

FIG. 1 illustrates an example electronic trading system 100 that includes a number of gateways 120-1, 120-2, ..., 120-g (collectively referred to as gateways 120), a set of core compute nodes 140-1, 140-2, ..., 140-c (collectively, the core compute nodes 140 or compute nodes 140), and one or more sequencers 150-1, 150-2, ..., 150-s (collectively, the sequencers 150). In some embodiments, the gateways 120, core compute nodes 140, and sequencers 150 are thus considered to be nodes in electronic trading system 100. As will be described in more detail below, in one embodiment, the gateways 120, compute nodes 140 and sequencers 150 are directly connected to one another, preferably via low latency, dedicated connections 180.

The term "peer" in relation to the discussion of the system 100 refers to another device that generally serves the same function (e.g., "gateway" vs. "core compute node" vs. "sequencer") in electronic trading system 100. For example, gateways 120-2, ..., 120-g are the peers for gateway 120-1, core compute nodes 140-2, ..., 140-c are the peers for core compute node 140-1, and sequencers 150-2, ..., 150-s are the peers for sequencer 150-1.

The electronic trading system 100 processes orders from and provides related information to one or more participant computing devices 130-1, 130-2, ..., 130-p (collectively, the participant devices 130). Participant devices 130 interact with the system 100, and may be one or more personal computers, tablets, smartphones, servers, or other data processing devices configured to display and receive trade order information. The participant devices 130 may be operated by a human via a graphical user interface (GUI), or they may be operated via high-speed automated trading methods running on some physical or virtual data processing platform.

Each participant device 130 may exchange messages with (that is, send messages to and receive messages from) the electronic trading system 100 via connections established with a gateway 120. While FIG. 1 illustrates each participant device 130 as being connected to electronic trading system 100 via a single connection to a gateway 120, it should be understood that a participant device 130 may be connected to electronic trading system 100 over multiple connections to one or more gateway devices 120.

Note that, while each gateway 120-1 may serve a single participant device 130, it typically serves multiple participant devices 130.

The compute nodes 140-1, 140-2, ..., 140-n (also referred to herein as matching engines 140 or compute engines 140) provide the matching functions described above and may also generate outgoing messages to be delivered to one or more participant devices 130. Each compute node 140 is a high-performance data processor and typically maintains one or more data structures to search and maintain one or more order books 145-1, ..., 145-b. An order book 145-1 may be maintained, for example, for each instrument for which the core compute node 140-1 is responsible. One or more of the compute nodes 140 and/or one or more of the gateways 120 may also provide market data feeds 147. Market data feeds 147 may be broadcast (for example, multicast), to subscribers, which may be participant devices 130 or any other suitable computing devices.

Some outgoing messages generated by core compute nodes 140 may be synchronous, that is, generated directly by a core compute node 140 in response to one or more incoming messages received from one or more participant devices 130, such as an outgoing "acknowledgement message" or "execution message" in response to a corresponding incoming "new order" message. In some embodiments, however, at least some outgoing messages may be asynchronous, initiated by the trading system 100, for example, certain "unsolicited" cancel messages and "trade break" or "trade bust" messages.

Distributed computing environments, such as the electronic trading system 100, can be configured with multiple matching engines operating in parallel on multiple compute nodes 140.

The sequencers 150 ensure that the proper sequence of any order-dependent operations is maintained. To ensure that operations on incoming messages are not performed out of order, incoming messages received at one or more gateways 120, for example, a new trade order message from one of participant devices 130, typically must then pass through at least one sequencer 150 in which they are marked with a sequence identifier. That identifier may be a unique, monotonically increasing value which is used in the course of subsequent processing throughout the distributed system 100 (e.g., electronic trading system 100) to determine the relative ordering among messages and to uniquely identify messages throughout electronic trading system 100. It should be understood, however, that while unique, the identifier is not limited to a monotonically increasing or decreasing value. Once sequenced, the marked incoming messages, that is the sequence-marked messages, are typically then forwarded by sequencer(s) 150 to other downstream compute nodes 140 to perform potentially order-dependent processing on the messages.

In some embodiments, messages may also flow in the other direction, that is, from a core compute node 140 to one or more of the participant devices 130, passing through one or more of the gateways 120. Such outgoing messages generated by a core compute node 140 may also be order-dependent, and accordingly may also typically first pass through a sequencer 150 to be marked with a sequence identifier. The sequencer 150 may then forward the marked response message to the gateways 120 in order to pass on to participant devices 130 in a properly deterministic order.

The use of a sequencer 150 to generate unique sequence numbers ensures the correct ordering of operations is maintained throughout the distributed system 100, regardless of which compute node or set of compute nodes 140 processes the messages. This approach provides "state determinism," to provide fault-tolerance, high availability and disaster recoverability.

It may also be important for a generating node (i.e., a node introducing a new message into the electronic trading system 100, for example by generating a new message and/or by forwarding a message received from a participant device 130) and its peer nodes to receive the sequence number assigned to that message. Receiving the sequence number for a message it generated may be useful to the generating node and its peer nodes not only for processing messages in order according to their sequence numbers, but also to correlate the message generated by the node with the message's identifier that is used throughout the rest of the electronic trading system 100. A subsequent message generated within the electronic trading system 100, while also being assigned its own sequence number, may yet reference one or more sequence numbers of related preceding messages. Accordingly, a node may need to quickly reference (by sequence number) a message the node had itself previously generated, because, for example, the sequence number of the message the node had generated was referenced in a subsequent message.

In some embodiments, the generating node may first send a message to the sequencer 150 and wait to receive the sequence number from the sequencer before the generating node forwards the message to other nodes in electronic trading system 100.

In alternate example embodiments, to avoid at least one hop, which could add undesirable increased latency within electronic trading system 100, after receiving the un-sequenced message from the generating node, sequencer 150 may not only send a sequenced version of the message (e.g., a sequence-marked message) to destination nodes, but may also send substantially simultaneously a sequenced version of the message back to the sending node and its peers. For example, after assigning a sequence number to an incoming message sent from the gateway 120-1 to core compute nodes 140, the sequencer 150 may not only forward the sequenced version of the message to the core compute nodes 140, but may also send a sequenced version of that message back to the gateway 120-1 and the other gateways 120. Accordingly, if any subsequent message generated in a core compute node 140 references that sequence number, any gateway 120 may easily identify the associated message originally generated by gateway 120-1 by its sequence number.

Similarly, in some further embodiments, a sequenced version of an outgoing message generated by and sent from a core compute node 140 to gateways 120, and sequenced by sequencer 150, may be forwarded by sequencer 150 both to gateways 120 and back to core compute nodes 140.

Some embodiments may include multiple sequencers 150 for high availability, for example, to ensure that another sequencer is available if the first sequencer fails. For embodiments with multiple sequencers 150 (e.g., a currently active sequencer 150-1, and one or more standby sequencers 150-2, . . . , 150-s), the currently active sequencer 150-1 may maintain a system state log (not shown) of all the messages that passed through sequencer 150-1, as well as the messages' associated sequence numbers. This system state log may be continuously or periodically transmitted to the standby sequencers to provide them with requisite system state to allow them to take over as an active sequencer, if necessary.

The system state log may also be continually or periodically replicated to one or more sequencers in a standby replica electronic trading system (not shown in detail) at a disaster recovery site 155, thereby allowing electronic trading to continue with the exact same state at the disaster recovery site 155, should the primary site of system 100 suffer catastrophic failure.

In some embodiments, the system state log may also be provided to a drop copy service 152, which may be implemented by one or more of the sequencers, and/or by one or more other nodes in the electronic trading system 100. The drop copy service 152 may provide a record of daily trading activity through electronic trading system 100 that may be delivered to regulatory authorities and/or clients, who may, for example be connected via participant devices 130. In alternate embodiments, the drop copy service 152 may be implemented on one or more gateways 120. Furthermore, in addition to or instead of referencing the system state log, the drop copy service 152 may provide the record of trading activity based on the contents of incoming and outgoing messages sent throughout electronic trading system 100. For example, in some embodiments, a gateway 120 implementing the drop copy service 152 may receive from the sequencer 150 (and/or from core compute nodes 140 and other gateways 120) all messages exchanged throughout the electronic trading system 100. A participant device 130 configured to receive the record of daily trading activity from the drop copy service 152 may not necessarily also be sending orders to and utilizing a matching function of electronic trading system 100.

Messages exchanged between participant devices 130 and gateways 120 may be according to any suitable protocol that may be used for financial trading (referred to for convenience as, "financial trading protocol"). For example, the messages may be exchanged according to custom protocols or established standard protocols, including both binary protocols (such as Nasdaq OUCH and NYSE UTP), and text-based protocols (such as NYSE FIX CCG). In some embodiments, the electronic trading system 100 may support exchanging messages simultaneously according to multiple financial trading protocols, including multiple protocols simultaneously on the same gateway 120. For example, participant devices 130-1, 130-2, and 130-3 may simultaneously have established trading connections and may be exchanging messages with gateway 120-1 according to Nasdaq Ouch, NYSE UTP, and NYSE FIX CCG, respectively.

Furthermore, in some embodiments, the gateways 120 may translate messages according to a financial trading protocol received from a participant device 130 into a normalized message format used for exchanging messages among nodes within the electronic trading system 100. The normalized trading format may be an existing protocol or may generally be of a different size and data format than that of any financial trading protocol used to exchange messages with participant devices 130. For example, the normalized trading format, when compared to a financial trading protocol of the original incoming message received at the gateway 120 from a participant 130, may include in some cases one or more additional fields or parameters, may omit one or more fields or parameters, and/or each field or parameter of a message in the normalized format may be of a different data type or size than the corresponding message received at gateway 120 from the participant device 130. Similarly, in the other direction, gateways 120 may translate outgoing messages generated in the normalized format by electronic trading system 100 into messages in the format of one or more financial trading protocols used by participant devices 130 to communicate with gateways 120.

In the era of high-speed trading, in which microseconds or even nanoseconds are consequential, participants 130 exchanging messages with the electronic trading system 100 are often very sensitive to latency, preferring low, predictable latency. The arrangement shown in FIG. 1 accommodates this requirement by providing a point-to-point mesh 172 architecture between at least each of the gateways 120 and each of the compute nodes 140. In some embodiments, each gateway 120 in the mesh 172 may have a dedicated high-speed direct connection 180 to the compute nodes 140 and the sequencers 150.

For example, dedicated connection 180-1-1 is provided between gateway 1 120-1 and core compute node 1 140-1, dedicated connection 180-1-2 between gateway 1 120-1 and compute node 2 140-2, and so on, with example connection 180-g-c provided between gateway 120-g and compute node 140-c, and example connection 180-s-c provided between sequencer 150 and core c 140-c.

It should be understood that each dedicated connection 180 in the mesh 172 is, in some embodiments, a point-to-point direct connection that does not utilize a shared switch. A dedicated or direct connection may be referred to interchangeably herein as a direct or dedicated "link" and is a direct connection between two end points that is dedicated (e.g., non-shared) for communication therebetween. Such a dedicated/direct link may be any suitable interconnect(s) or interface(s), such as disclosed further below, and is not limited to a network link, such as wired Ethernet network connection or other type of wired or wireless network link. The dedicated/direct connection/link may be referred to herein as an end-to-end path between the two end points. Such an end-to-end path may be a single connection/link or may include a series of connections/links; however, bandwidth of the dedicated/direct connection/link in its entirety, that is, from one end point to another end point, is non-shared and neither bandwidth nor latency of the dedicated/direct connection/link can be impacted by resource utilization of element(s) if so traversed. For example, the dedicated/direct connection/link may traverse one or more buffer(s) or other elements that are not bandwidth or latency impacting based on utilization thereof. The dedicated/direct connection/link would not, however, traverse a shared network switch as such a switch can impact bandwidth and/or latency due to its shared usage.

For example, in some embodiments, the dedicated connections 180 in the mesh 172 may be provided in a number of ways, such as a 10 Gigabit Ethernet (GigE), 25 GigE, 40 GigE, 100 GigE, InfiniBand, Peripheral Component Interconnect—Express (PCIe), RapidIO, Small Computer System Interface (SCSI), FireWire, Universal Serial Bus (USB), High Definition Multimedia Interface (HDMI), or custom serial or parallel busses.

Therefore, although the compute engines 140, gateways 120, sequencers 150 and other components may sometimes be referred to herein as "nodes", the use of terms such as "compute node" or "gateway node" or "sequencer node" or "mesh node" should not be interpreted to mean that particular components are necessarily connected using a network link, since other types of interconnects or interfaces are possible. Further, a "node," as disclosed herein, may be any suitable hardware, software, firmware component(s), or combination thereof, configured to perform the respective function(s) set forth for the node. As explained in more detail below, a node may be a programmed general purpose processor, but may also be a dedicated hardware device, such as a field programmable gate array (FPGA), application specific integrated circuit (ASIC), or other hardware device or group of devices, logic within a hardware device, printed circuit board (PCB), or other hardware component.

It should be understood that nodes disclosed herein may be separate elements or may be integrated together within a single element, such as within a single FPGA, ASIC, or other element configured to implement logic to perform the functions of such nodes as set forth herein. Further, a node may be an instantiation of software implementing logic executed by general purpose computer and/or any of the foregoing devices.

Conventional approaches to connecting components, such as compute engines 140, gateways 120, and sequencers 150 through one or more shared switches, do not provide the lowest possible latency. These conventional approaches also result in unpredictable spikes in latency during periods of heavier message traffic.

In an example embodiment, dedicated connections 180 are also provided directly between each gateway 120 and each sequencer 150, and between each sequencer 150 and each core compute node 140. Furthermore, in some embodiments, dedicated connections 180 are provided among all the sequencers, so that an example sequencer 150-1 has a dedicated connection 180 to each other sequencer 150-2, . . . , 150-s. While not pictured in FIG. 1, in some embodiments, dedicated connections 180 may also be provided among all the gateways 120, so that each gateway 120-1 has a dedicated connection 180 to each other gateway 120-2, . . . , 120-g. Similarly, in some embodiments, dedicated connections 180 are also provided among all the compute nodes 140, so that an example core compute node 140-1 has a dedicated connection 180 to each other core compute node 140-2, . . . , 140-c.

It should also be understood that a dedicated connection 180 between two nodes (e.g., between any two nodes 120, 150, or 140) may in some embodiments be implemented as multiple redundant dedicated connections between those same two nodes, for increased redundancy and reliability. For example, the dedicated connection 180-1-1 between gateway 120-1 and core compute node 140-1 (e.g., Core 1) may actually be implemented as a pair of dedicated connections.

In addition, according to some embodiments, any message sent out by a node is sent out in parallel to all nodes directly connected to it in the point-to-point mesh 172. Each node in the mesh 172 may determine for itself, for example, based on the node's configuration, whether to take some action upon receipt of a message, or whether instead simply to ignore the message. In some embodiments, a node may never completely ignore a message; even if the node, due to its configuration, does not take substantial action upon receipt of a message, it may at least take minimal action, such as consuming any sequence number assigned to the message by the sequencer 150. That is, in such embodiments, the node may keep track of a last received sequence number to ensure that when the node takes more substantial action on a message, it does so in proper sequenced order.

For example, a message containing an order to "Sell 10 shares of Microsoft at $190.00" might originate from participant device 130-1, such as a trader's personal computer, and arrive at gateway 120-1 (i.e., GW 1). That message will be sent to all core compute nodes 140-1, 140-2, . . . , 140-c even though only core compute node 140-2 is currently performing matching for Microsoft orders. All other core compute nodes 140-1, 140-3, . . . , 140-c may upon receipt ignore the message or only take minimal action on the message. For example, the only action taken by 140-1, 140-3, . . . , 140-c may be to consume the sequence number assigned to the message by the sequencer 150-1. That message will also be sent to all of the sequencers 150-1, 150-2, . . . , 150-s even though a single sequencer (in this example, sequencer 150-1) is the currently active sequencer servicing the mesh. The other sequencers 150-2, . . . , 150-s also received the message to allow them the opportunity to take over as the currently active sequencer should sequencer 150-1 (the currently active sequencer) fail, or if the overall reliability of the electronic trading system 100 would increase by moving to a different active sequencer. One or more of the other sequencers (sequencer 150-2 for example) may also be responsible for relaying system state to the disaster recovery site 155. The disaster recovery site 155 may include a replica of electronic trading system 100 at another physical location, the replica comprising physical or virtual instantiations of some or all of the individual components of electronic trading system 100.

By sending each message out in parallel to all directly connected nodes, the system 100 reduces complexity and also facilitates redundancy and high availability. If all directly connected nodes receive all messages by default, multiple nodes can be configured to take action on the same message in a redundant fashion. Returning to the example above of the order to "Sell 10 shares of Microsoft at $190.00", in some embodiments, multiple core compute nodes 140 may simultaneously perform matching for Microsoft orders. For example, both core compute node 140-1 and core compute node 140-2 may simultaneously perform matching for Microsoft messages, and may each independently generate, after having received the incoming message of the "Sell" order, a response message such as an acknowledgement or execution message that each of core compute node 140-1 and core compute node 140-2 sends to the gateways 120 through the sequencer(s) 150 to be passed on to one or more participant devices 130.

Because of the strict ordering and state determinism assured by the sequencer(s) 150, it is possible to guarantee that each of the associated response messages independently generated by and sent from the core compute nodes 140-1 and 140-2 are substantially equivalent; accordingly, the architecture of electronic trading system 100 readily supports redundant processing of messages, which increases the availability and resiliency of the system. In such embodiments, gateways 120 may receive multiple associated outgoing messages from core compute nodes 140 for the same corresponding incoming message. Due to the fact that it can be guaranteed that these multiple associated response messages are equivalent, the gateways 120 may simply process only the first received outgoing message, ignoring subsequent associated outgoing messages corresponding to the same incoming message. In some embodiments, the "first" and "subsequent" messages may be identified by their associated sequence numbers, as such messages are sequence-marked messages. Allowing the gateways 120 to take action on the first of several associated response messages to reach them may therefore also improve the overall latency of the system.

Such a point-to-point mesh 172 architecture of system 100, besides supporting low, predictable latency and redundant processing of messages, also provides for built-in redundant, multiple paths. As can be seen, there exist multiple paths between any gateway 120 and any compute node 140. Even if a direct connection 180-1-1 between gateway 120-1 and compute node 140-1 becomes unavailable, communication is still possible between those two elements via an alternate path, such as by traversing one of the sequencers 150 instead. Thus, more generally speaking, there exist multiple paths between any node and any other node in the mesh 172.

Furthermore, this point-to-point mesh architecture inherently supports another important goal of a financial trading system, namely, fairness. The point-to-point architecture with direct connections between nodes ensures that the path between any gateway 120 and any core compute node 140, or between the sequencer 150 and any other node has identical or, at least very similar latency. Therefore, two incoming messages sent out to the sequencer 150 at the same time from two different gateways 120 should reach the sequencer 150 substantially simultaneously. Similarly, an outgoing message being sent from a core compute node 140 is sent to all gateways 120 simultaneously, and should be received by each gateway at substantially the same time.

Because the topology of the point-to-point mesh does not favor any single gateway 120, chances are minimized that being connected to a particular gateway 120 may give a participant device 130 an unfair advantage or disadvantage.

Additionally, the point-to-point mesh architecture of system 100 allows for easily reconfiguring the function of a node, that is, whether a node is currently serving as a gateway 120, core compute node 140 or sequencer 150. It is particularly easy to perform such reconfiguration in embodiments in which each node has a direct connection between itself and each other node in the point-to-point mesh. When each node is connected via a direct connection to each other node in the mesh, no re-wiring or re-cabling of connections 180 (whether physical or virtual) within the point-to-point mesh 172 is required in order to change the function of a node in the mesh (for example, changing the function of a node from a core compute node 140 to a gateway 120, or from a gateway 120 to a sequencer 150). In such embodiments, the reconfiguration required that is internal to the mesh 172 may be easily accomplished through configuration changes that are carried out remotely. In the case of a node being reconfigured to serve as a new gateway 120 or being reconfigured from serving as a gateway 120 to another function, there may be some ancillary networking changes required that are external to the mesh 172, but the internal wiring of the mesh may remain intact.

Accordingly, in some embodiments, the reconfiguration of the function of a node may be accomplished live, even dynamically, during trading hours. For example, due to changes on characteristics of the load of electronic trading system 100 or new demand, it may be useful to reconfigure a core compute node 140-1 to instead serve as an additional gateway 120. After some possible redistribution of state or configuration to other compute nodes 140, the new gateway 120 may be available to start accepting new connections from participant devices 130.

In some embodiments, lower-speed, potentially higher latency shared connections 182 may be provided among the system components, including among the gateways 120 and/or the core compute nodes 140. These shared connections 182 may be used for maintenance, control operations, management operations, and/or similar operations that do not require very low latency communications, in contrast to messages related to trading activity carried over the dedicated connections 180 in the mesh 172. Shared connections 182, carrying non-trading traffic, may be over one or more shared networks and via one or more network switches, and nodes in the mesh may be distributed among these shared networks in different ways. For example, in some embodiments, gateways 120 may all be in a gateway-wide shared network 182-g, compute nodes 140 may be in their own respective compute node-wide shared network 182-c, and sequencers 150 may be in their own distinct sequencer-wide shared network 182-s, while in other embodiments all the nodes in the mesh may communicate over the same shared network for these non-latency sensitive operations.

Distributed computing environments such as electronic trading system 100 sometimes rely on high resolution clocks to maintain tight synchronization among various components. To that end, one or more of the nodes 120, 140, 150 might be provided with access to a clock, such as a high-resolution GPS clock 195 in some embodiments.

Figure 2:
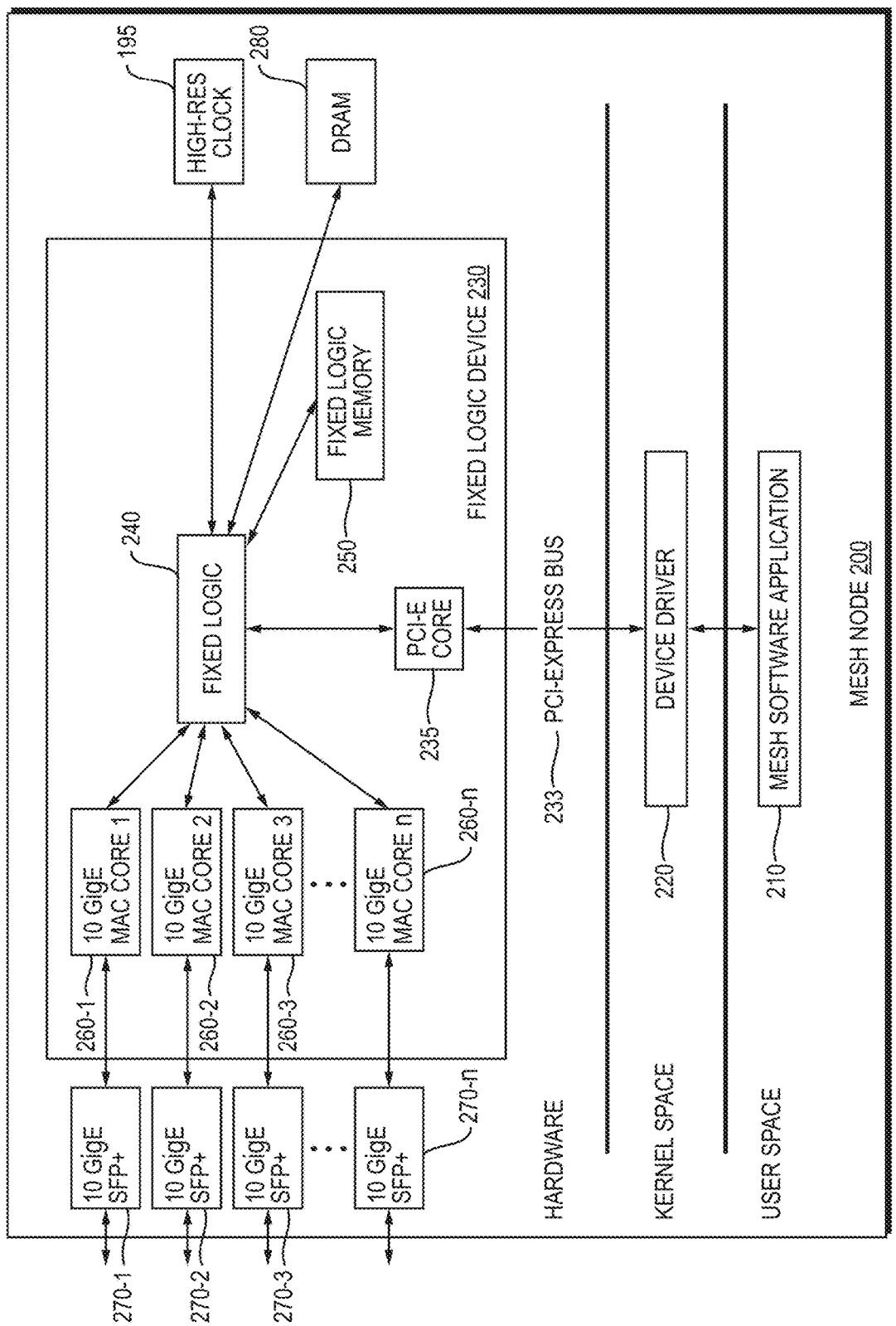
FIG. 2 is a more detailed view of a system component such as a gateway or compute node.

For purposes of the following discussion, gateways 120, compute nodes 140, and sequencers 150 connected in the mesh 172 may be referred to as "Mesh Nodes". FIG. 2 illustrates an example embodiment of a Mesh Node 200 in the point-to-point mesh 172 architecture of electronic trading system 100. Mesh node 200 could represent a gateway 120, a sequencer 150, or a core compute node 140, for example. Although in this example, functionality in the Mesh Node 200 is distributed across both hardware and software, Mesh Node 200 may be implemented in any suitable combination of hardware and software, including pure hardware and pure software implementations, and in some embodiments, any or all of gateways 120, compute nodes 140, and/or sequencers 150 may be implemented with commercial off-the-shelf components.

In the embodiment illustrated by FIG. 2, in order to achieve low latency, some functionality is implemented in hardware in Fixed Logic Device 230, while other functionality is implemented in software in Device Driver 220 and Mesh Software Application 210. Fixed Logic Device 230 may be implemented in any suitable way, including an Application-Specific Integrated Circuit (ASIC), an embedded processor, or a Field Programmable Gate Array (FPGA). Mesh Software Application 210 and Device Driver 220 may be implemented as instructions executing on one or more programmable data processors, such as central processing units (CPUs). Different versions or configurations of Mesh Software Application 210 may be installed on Mesh Node 200 depending on its role. For example, based on whether Mesh Node 200 is acting as a gateway 120, sequencer 150, or core compute node 140, a different version or configuration of Mesh Software Application 210 may be installed.

While any suitable physical communications link layer may be employed, (including USB, Peripheral Component Interconnect (PCI)-Express, High Definition Multimedia Interface (HDMI), 10 Gigabit Ethernet (GigE), 25 GigE, 40 GigE, 100 GigE, or InfiniBand (IB), over fiber or copper cables), in this example, Mesh Node 200 has multiple low latency 10 Gigabit Ethernet SFP+ connectors (interfaces) 270-1, 270-2, 270-3, . . . , 270-n, (known collectively as connectors 270). Connectors 270 may be directly connected to other nodes in the point-to-point mesh via dedicated connections 180, connected via shared connections 182, and/or connected to participant devices 130 via a gateway 120, for example. These connectors 270 are electronically coupled in this example to 10 GigE MAC Cores 260-1, 260-2, 260-3, . . . , 260-n, (known collectively as GigE Cores 260), respectively, which in this embodiment are implemented by Fixed Logic Device 230 to ensure minimal latency. In other embodiments, 10 GigE MAC Cores 260 may be implemented by functionality outside Fixed Logic Device 230, for example, in PCI-E network interface card adapters.

In some embodiments, Fixed Logic Device 230 may also include other components. In the example of FIG. 2, Fixed Logic Device 230 also includes a Fixed Logic 240 component. In some embodiments, fixed Logic component 240 may implement different functionality depending on the role of Mesh Node 200, for example, whether it is a gateway 120, sequencer 150, or core compute node 140. Also included in Fixed Logic Device 230 is Fixed Logic Memory 250, which may be a memory that is accessed with minimal latency by Fixed Logic 240. Fixed Logic Device 230 also includes a PCI-E Core 235, which may implement PCI Express functionality. In this example, PCI Express is used as a conduit mechanism to transfer data between hardware and software, or more specifically, between Fixed Logic Device 240 and the Mesh Software Application 210, via Device Driver 220 over PCI Express Bus 233. However, any suitable data transfer mechanism between hardware and software may be employed, including Direct Memory Access (DMA), shared memory buffers, or memory mapping.

In some embodiments, Mesh Node 200 may also include other hardware components. For example, depending on its role in the electronic trading system 100, Mesh Node 200 in some embodiments may also include High-Resolution Clock 195 (also illustrated in and discussed in conjunction with FIG. 1) used in the implementation of high-resolution clock synchronization among nodes in electronic trading system 100. A Dynamic Random-Access Memory (DRAM) 280 may also be included in Mesh Node 200 as an additional memory in conjunction with Fixed Logic Memory 250. DRAM 280 may be any suitable volatile or non-volatile memory, including one or more random-access memory banks, hard disk(s), and solid-state disk(s), and accessed over any suitable memory or storage interface.

Deterministic Latency

As mentioned above, the architecture of system 100 inherently supports another important goal of a financial trading system, namely, fairness. The basic idea is that delays through the system do not favor the user of any single gateway 120 or core 140, thus minimizing the chance that being connected to a particular gateway 120 may give any participant device 130 an unfair advantage or disadvantage over another. The end is accomplished, by controlling latency, that is the time between which messages arrive within the system and the time at which corresponding messages are permitted to leave the system.

Figure 3A:
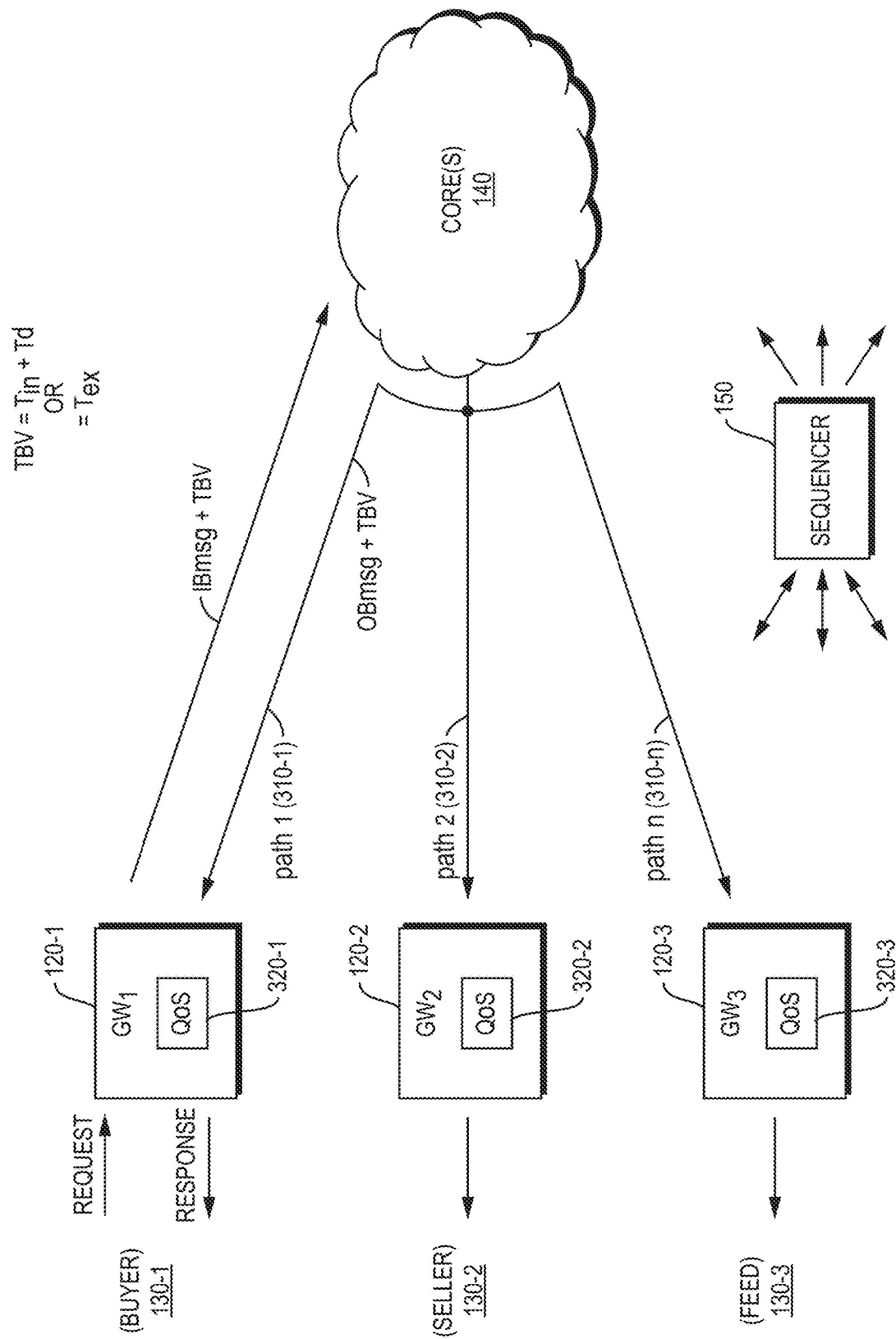
FIG. 3A illustrates how a time based value is applied to inbound and outbound messages.

Turning attention to FIG. 3A, an inbound request message is received at a gateway 120-1. Gateway 120-1 processes the request message and generates an internal message, IBmsg, destined for one or more of the cores 140. IBmsg adds at least one field, such as time based value (TBV) to the request message. The TBV may be inserted into some unused field of a standard message, or TBV may be encoded in IBmsg according to some proprietary internal protocol.

In one implementation, the time based value TBV can be determined by the fixed logic 240 within gateway 120-1. The TBV may correspond to a time that the request message was received by the gateway 120-1 (referred to here as the ingress timestamp or arrival time, Tar), or in other implementations, may correspond to a desired exit time (referred to herein as the egress time or exit time, Tex) for a corresponding response message to be returned by the system 100. In that case, TBV is determined from the time of receipt Tar plus some deterministic time delay value (referred to as Td, as described in more detail below).

The inbound message IBmsg and its corresponding time based value TBV is then forwarded along a path 310-1 through the mesh to the cores 140 for processing. Typically, a selected one of the cores, such as core 140-2 then further processes IBmsg and generates an outbound message OBmsg that contains some response data as well as the TBV (or some other value that depends on the TBV). Outbound messages return along a path such as path 310-2 back to gateway 120-1. The gateway 120-1 then schedules OBmsg to exit the system 100, sending it to the participant 130-1 at a precise exit time Tex. An element we refer to as an egress Quality of Service (QoS) shaper 320 controls the exit time for outbound messages OBmsg.

The precise exit time Tex is determined from the time based value TBV that was carried with IBmsg and OBmsg and a desired deterministic delay or latency, Td. The deterministic delay Td is not necessarily directly dependent on the actual amount of time it takes for any particular response to be returned to the gateway 120 from the cores 140. As explained in more detail below, Td may depend upon a maximum expected time that any inbound message IBmsg requires to be fully processed by the system 100.

Although it has been mentioned that the exit time Tex can be determined by the gateway 120 from the TBV (using the arrival time, Tar), the exit time Tex can also be determined in other ways, such as by the sequencer 150.

The time based value TBV may take different forms. It may simply be the time at which the corresponding inbound request message was originally received at gateway 120-1, Tar. In that instance, a time delay value (Td) is added to TBV to arrive at the exit time Tex at which the outbound message OBmsg will exit the gateway 120-1. In configurations where the deterministic delay Td is a fixed time, this fixed value can be stored or otherwise implemented in the gateway 120 (or the sequencer 150) at configuration time.

However, in other implementations, the time based value TBV carried with IBmsg and the corresponding OBmsg may be the actual desired time exit value Tex (that is, instead of the arrival time Tar).

It should also be noted that some inbound messages IBmsg will not necessarily be forwarded to one of the cores 140. For example, fixed logic within the gateway 120 may reject IBmsg if it is invalid, for example, for having a bad checksum, or some other case for which the gateway 120-1 cannot determine to which core 140 IBmsg is to be sent). Thus, it should be understood that the outbound message OBmsg may not actually originate from one of the cores 140, but rather from the gateway 120-1. However, even in that instance, it may be desirable for OBmsg to still be sent at an exit time Tex that corresponds to a deterministic delay Td after the original request message was received at time Tar.

In some instances, the outbound message OBmsg may be destined for more than one recipient device 130. In such instances, OBmsg is still sent to all such multiple consumers of the response at precisely the same exit time Tex. There is high confidence that the message can be sent to multiple recipients at the same precise exit time, due to the fact that the components of the system are typically implemented as highly synchronized, hardware components as explained above.

Continuing to refer to FIG. 3A, in one example the inbound request message may originate from a participant device 130-1 who is a buyer in a transaction. Participant device 130-2 connected to gateway 120-2 may be the seller in the transaction, and participant device 130-3 connected to gateway 120-3 may be a service such as a market data feed that reports such transactions.

Although the buyer, seller, and market feed are shown as each being connected to a different gateway, it should be understood that arrangement is not important. These three participants might all be connected to the same gateway 120-2, or only the buyer and seller to the same gateway 120-1, with the market data feed on another gateway 120-3, etc.

Depending on the message type and the current load on the distributed system, the total time taken to return a response message (or otherwise process an inbound message) by the system (that is, the total time the message stays within the system 100, from the point at which it enters a gateway Tar to the point at which a corresponding response message is ready to be sent out over that gateway at) may range for example, between 400-800 nanoseconds. However, the egress QOS shaper 320 may be configured to send any corresponding response at a precise interval of 1000 nanoseconds (1 microsecond). Accordingly, after the OBmsg message has reached the gateway node 120-1 as it is being readied to be sent out to the trading participant 130-1, the outbound message OBmsg enters the egress QOS shaper 320-1. In one implementation, OBmsg may remain in the egress shaper 320 for several hundred nanoseconds until exactly one microsecond has elapsed since the original request message was received at the gateway 120-1. This ensures that as long as the configured latency interval is set to a sufficiently high value (such that the distributed system as a whole can comfortably guarantee that it can process any inbound message within that interval), a response message such as OBmsg will always be returned at a precise, deterministic time interval after inbound message IBmsg was received.

Additionally, the QOS level (i.e., the deterministic latency interval Td) may be tuned on an individual connection basis, on a per-gateway basis, or system-wide. In some embodiments, the QOS level may be configured on a per-participant or per-connection basis, optionally associated with varying cost subscription levels. While allowing different participants 130 to pay for different levels of QOS mitigates against fairness as a goal, such a feature may still be desirable to the provider of the distributed service as an additional revenue stream.

The system wide QOS level may also be set either manually or even dynamically. For example, the system 100 may dynamically temporarily increase the deterministic latency interval Td across the entire system 100 in the event an exceptional event occurs that threatens to cause the system not to satisfy the typical latency interval Td. This could be an internal event, such as a failure of one or more components or nodes in the distributed system, that will cause the system to temporarily degrade performance until the problematic components can be hot-swapped or new compute nodes brought online. The exceptional event could also be caused external to the distributed system, such as a news event that results in a huge increase in activity on or demand for the distributed system. When the exceptional event is resolved, the latency interval Td could be tuned back down, even dynamically, to its typical level.

In some embodiments, a message from a single client 130 (market participant) may trigger the need to generate and send acknowledgements or other types of response messages to numerous participants 130 and/or over multiple participant connections. In some cases, the content of the multiple messages is substantially identical among the multiple participants, whereas in other cases, a given inbound message IBmsg generates several related but different response messages OBmsgs, each with content that may be specific to a single participant or to a subset of participants.

In one example, for many protocols, when a trade match occurs, a separate execution message may be generated for each match party. Each execution message will contain information that is specific to that party, such as an "Order Token," assigned by the client to identify the order. The two execution messages are related to the extent that they will share some information in common, such as a unique market-assigned 'Execution ID' or 'Match number'. These two execution messages may be generated by the same compute core 140, and their egress time Tex should be the same, so that the two messages are sent simultaneously.

Thus, according to some embodiments, two or more related response messages are sent to multiple participants 130 simultaneously at the same precise deterministic time interval, regardless of whether the multiple participant connections are on the same or on different gateways. Each related response message should contain a TBV that is the original timestamp value (or the desired egress time, or some other time-based value TBV related to the corresponding ingress time) corresponding to the incoming message IBmsg that triggered the responses. Thus, assuming the internal clocks of the various gateways are synchronized, the QOS shaper 320 on each gateway can ensure that each of the related responses is sent at the same precise time interval, and in turn, ensuring fairness among all clients 130 privy to receiving the related responses.

In some embodiments, the response from the core 140 may be a single outbound message OBmsg that arrives at the gateway(s) 120. However, that in turn causes the gateway(s) 120 to generate two or more related but not identical messages, the related messages differing in their destination address, and/or by having some other client-specific identifier, such as an order token, in their encoding as a result of the protocol associated with the participant 130, etc.

The cores 140 may provide a financial trading system's matching engine that may generate a match between an order to buy a security and a corresponding order to sell that security. In some instances, where these two orders are typically placed at different times by two different parties, a successful match triggers an acknowledgement or execution message to be sent to both counter parties (e.g., buyer and seller) in the match. While the execution message OBmsg going to each counter party contains information specific to that specific client's trade, such an execution message will be sent to the two parties at the exact same time, ensuring fairness. In this example, the latency interval for both of the resulting related responses may be set based off the incoming timestamp of one of the orders participating in the match (for example, the last of the two orders to arrive as an inbound request message).

In another related example implementation for a financial system's matching engine, client devices 130 may typically subscribe to streams of market data messages sent from the matching engine notifying subscribers of real time activity across the market as a whole, including activity in which the subscribing client is not a participating party, such as recent executions between two third parties. Such a market data message in some embodiments is sent out to all subscribers simultaneously based on the timestamp value in the message as processed by the egress QOS shaper 320. In some embodiments, the sending of the market data messages to subscribers is timed to match the sending time of any acknowledgment or execution messages sent to market participants that are direct parties to the activity reflected in the market data messages also sent to subscribers. To return to the example of a match between two market participants (a buyer and a seller) that results in a pair of execution messages OBmsg sent to both counter parties, this match activity may also be reported to market data subscribers.

In some embodiments, the system 100 ensures that not only are both acknowledgement messages sent to the counter parties at the same time, but these acknowledgement messages are timed to also be sent at the same time as the market data messages reflecting this execution sent to market data subscribers, thereby ensuring that no market participant has prior access to useful financial information.

More generally, the system 100 provides precise control over when outbound messages are sent. In some instances, fairness to everyone is important, and so the response messages to multiple recipients can be released at the same time. Or in another embodiment, the system may be configured to release the response to the participants 130-1, 130-2 who are parties to a transaction a bit sooner than to a market feed 130-3. Or perhaps the market feed 130-3 receives the response sooner than the participants 130-1, 130-2 to the transaction. In yet other configurations, the system 100 rewards participants 130 who are "liquidity adders" by letting them know sooner, and retards "liquidity removers" by letting them know later.

Figure 3B:
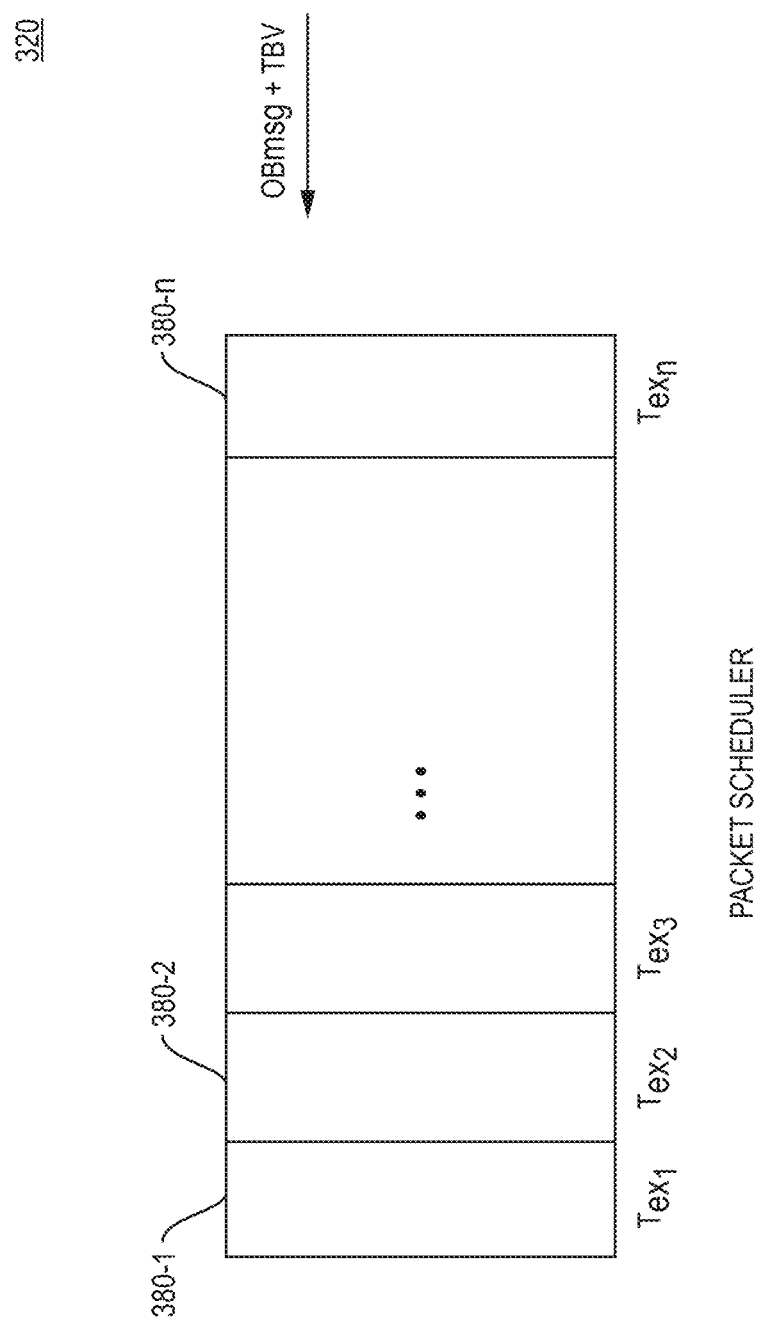
FIG. 3B illustrates a packet scheduler.

FIG. 3B is an example of an egress QOS shaper 320 that may be located inside one or more gateways 120. Each OBmsg is received with its corresponding time based value TBV. The TBV is then used with the desired latency Td to determine an exit time Tex at which the message will be sent out of the gateway 120. Specifically, when the TBV is the receipt time for corresponding inbound message IBmsg, the corresponding deterministic delay, Td, may be added to the TBV to arrive at Tex.

The egress QOS shaper 320 may be implemented as a "packet scheduler," organized into a set of indexed storage locations 380-1, 380-2, ..., 380-n (or "buckets"), with a location 380 associated with each discrete high precision egress timing interval Tex1, Tex2, ..., Texn. Each message placed in a particular bucket 380, is released at the precise time interval associated with the bucket. Each bucket may contain a list of zero or more outbound messages OBmsg.

As explained previously, in an alternative implementation, rather than assigning an inbound timestamp as the TBV associated with each arriving message in the gateway, TBV may instead be allocated as the desired outbound indexed location or bucket of the packet scheduler 320. Thus, when the desired egress time is used as the TBV, it can be considered to directly correlate to the exit time Tex.

Although the message scheduler 320 may be a ring data structure that wraps, other implementations are possible. For example, message scheduler 320 may also be implemented as a set of linked lists with pointers, for example, with one linked list for each exit time Tex. Note that the "time" value, be it an arrival or exit time, can be with reference to an absolute or relative time.

Figure 4:
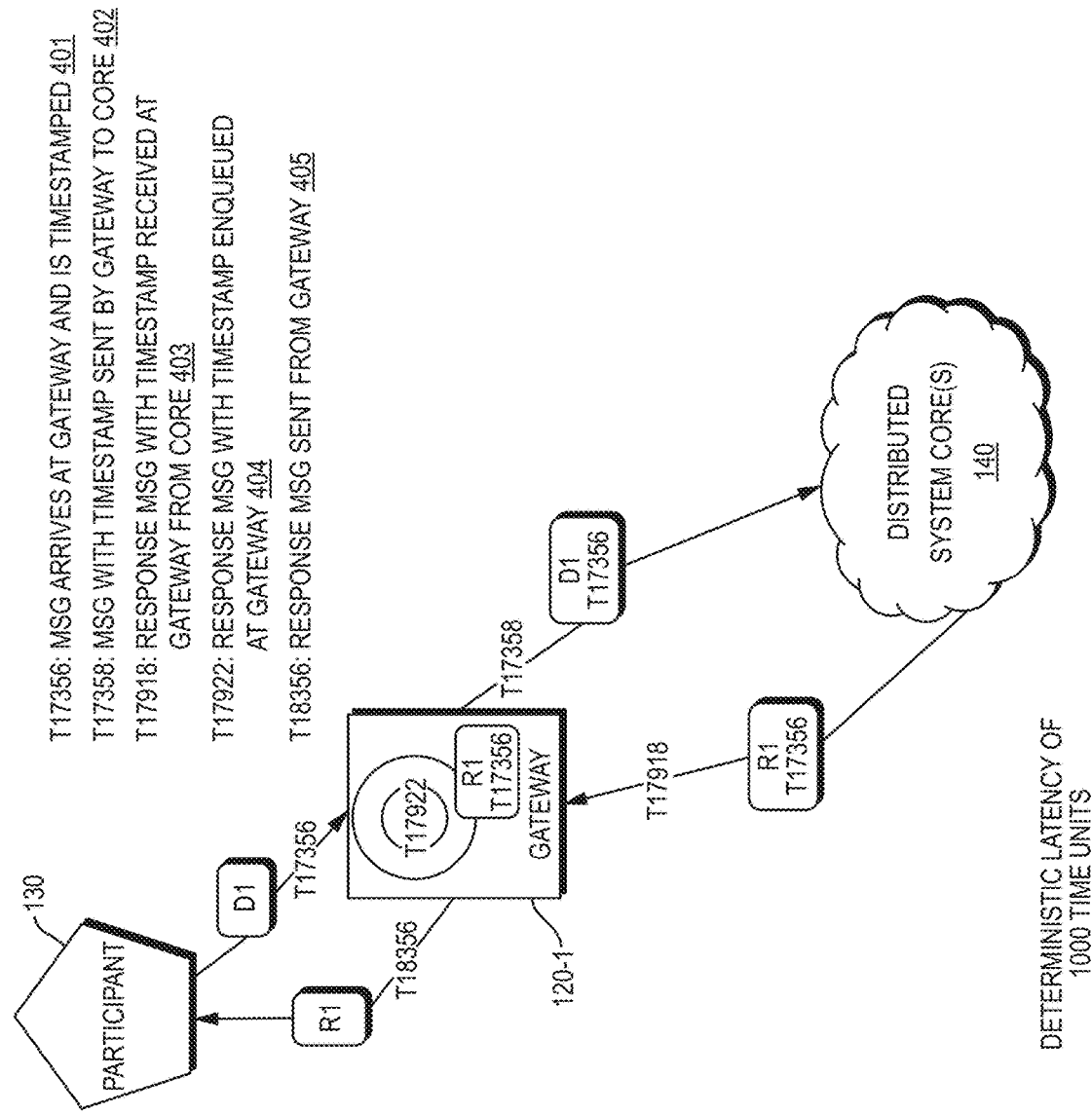
FIG. 4 is an example where the system provides a deterministic latency of 1000 time units.

FIG. 4 is an example of an inbound message IBmsg arriving from a market participant 130 at a gateway 120-1, and a reply being sent as an outbound message OBmsg with a deterministic latency (e.g., Td) of 1000 time units (where a time unit may be a nanosecond).

In an initial state 401, the request message arrives at the gateway 120-1 and a timestamp TBV is added to it, to generate an internal message D1 (e.g., IBmsg). This state 401 may occur at a time T 17356. Next, at time T 17358 the message D1 including the timestamp TBV is sent by the gateway 120-1 to one of the cores 140. At a later time, in state 403, such as at time T 17918, a response message (R1) with the same timestamp TBV is received back at the gateway 120-1 from the core 140. Next, in state 404 (which may occur at time T 17922) an internal response message R1 with the timestamp is fed into the packet scheduler 320, which determines the appropriate outgoing timeslot (which in this example, is arrival time T 17356 plus 1000, or a time of T 18356). Finally, in state 405, the precise time T 18356 is reached, at which point the packet scheduler permits the response message (R1) to exit the gateway as the system-level outbound message OBmsg.

FIG. 5 shows an example embodiment where an outbound message OBmsg results from an event internal to the system 100, as opposed to being a "response" to some inbound "request" message. In this example, the OBmsg is "asynchronous" to any corresponding inbound message. Such asynchronous messages should still be marked and handled with a scheduled egress time Tex.

One example of an asynchronous message in a trading system might be an Order Cancel triggered by a timer. A matching engine in the core might generate such a Cancel message when a "time in force" associated with a resting order expires. Since the Cancel message is be broadcast to more than one client/participant (for example, both the initiator of the order as well as a market data feed), it should exit all gateways to all destination participants at the same time.

In this instance, the exit time Tex may be determined by the core 140 that originates the message. In other implementations, the exit time Tex may be determined by one of the sequencers 150 through which OBmsg will travel.

Thus, as part of ensuring deterministic latency, an outbound message needing to be sent to multiple participants will be sent at the same exit time Tex, regardless of whether the outbound message was generated as part of a request-response or whether it instead was an asynchronous message originated internally within the mesh.

It should also be understood that the concept of having a deterministic latency encompasses more than just a fixed time. In other implementations, therefore, the deterministic latency may include using a set of several fixed time values that are evenly distributed across a range according to fairness criteria. The particular sequence of time values may be statistically evenly and randomly distributed across the range.

Accordingly, the system 100 also supports deterministic latency variation, in which latency values Td are order-randomized within an evenly spanned latency value range. In such embodiments, time stamps are associated with inbound messages IBmsg in much the same way as described above, with the one difference being that the egress QOS shaper assigns the message to a time slot that depends on an order-randomized latency value within a bounded range.

In such embodiments, the egress QOS shaper 320 could be considered to assign outgoing time slots in a manner similar to that of dealing a card from a deck of playing cards, so that once a latency value in the range has been assigned, that particular latency value will not be assigned again until all other values in the range have also been assigned and the "deck" is reshuffled. While in one embodiment the QOS shaper 320 is responsible for assigning the order-randomized latency value, in other embodiments, other components such a gateway 120 or sequencer 150 may assign these values at the time an inbound message is received.

In an implementation where the varying but still deterministic delay, Td, follows some determined pattern, Td will not necessarily be the same for each inbound message, IBmsg. Thus, it may be desirable to carry the Td value assigned to each message along with its associated ingress time Tar, as the "time based values" TBV for each message. This then enables the gateway 120 to determine the correct exit time Tex at egress time for the corresponding outbound message(s) OBmsg. In other embodiments, however, the varying but deterministic delay Td can be added to the arrival time Tar right at ingress time, such that the TBV is the single value, Tex. In other words, using the exit time Tex as the TBV in the variable delay case avoids the need to carry both the delay value Td and the ingress time Tar with each message)

FIG. 6A illustrates an example where the system assigns a deterministic latency (Td) of 2000 time units to a particular message, as selected from a deterministic range of between 1000 and 5000 time units. Similar to the example of FIG. 4, at state 602 a time T 17356 is reached in which an inbound message arrives at gateway 120-1. The message is time stamped with a TBV of 17356. At state 603 the inbound message with that timestamp is sent by the gateway to the core at (time T17358). At state 604 (time T 17918) a response message with the same timestamp is received back at the gateway from the cores 140. At state 605 (time T 17922), the response message with the timestamp is queued at the packet scheduler within the gateway 120-1. One or more response messages are then sent out from the gateway in state 606 (at T 19356), because this particular message was assigned a latency of 2000 time units from the set of values that range from 1000 to 5000 time units. The specific latency value assigned to a message (that is, its place in the packet scheduler) can be determined by the gateway at the time the message is received, or in other ways, as already explained elsewhere.

Figure 6B:
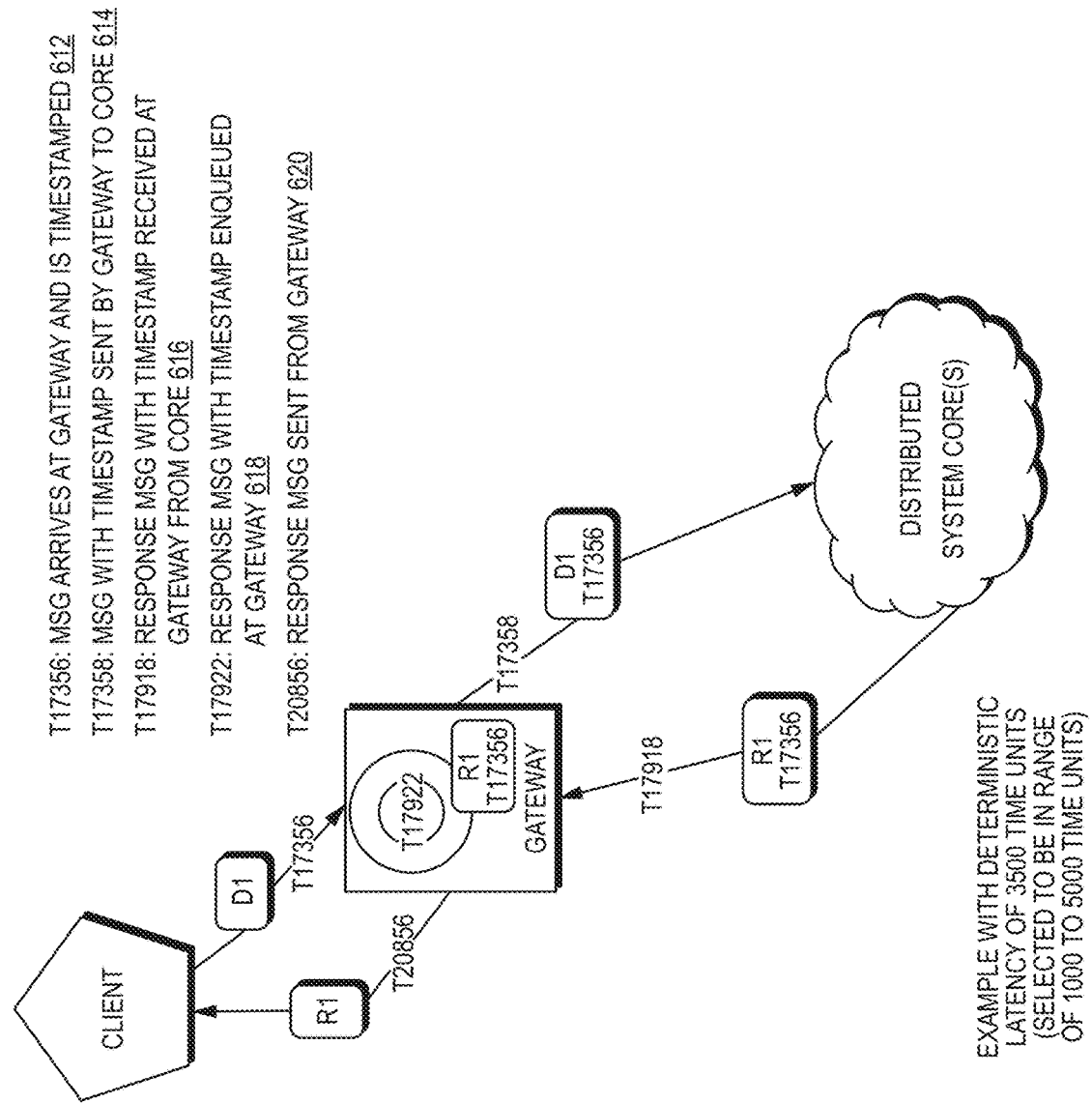
FIG. 6B is an example where the system provides a deterministic latency of 3500 time units selected from a deterministic range.

FIG. 6B is a similar example, but here the assigned deterministic latency for this message was determined by the system to be 3500 time units (as selected from the same range of 1000-5000 units). The processing is otherwise similar to FIG. 6A, albeit with a different deterministic delay. Starting at state 612, the message arrives at the gateway at time T 17356 and is time stamped. At state 614 (time T 17358) the message exits the gateway and is forwarded to the core. At state 616 (time T 17918) a response message with the timestamp is returned to the gateway from the core. Next in state 618 (time T 17922) the response message with the timestamp is queued in the packet scheduler, and the response message does not exit the gateway until state 620 (time T 20856).

FIG. 7 is an example of how a pattern such as an order-randomized set of values may be assigned to the deterministic latency. Here the bounded range is from 1000 to 5000 time units, with an increment between slots of 500 time units. The QOS shaper has generated a sequence of nine (9) evenly distributed Tex values as 2000, 3500, 2500, 1500, 4000, 5000, 4500, 3000, and 1000. Once the initial sequence of values is used up, the QOS shaper repeats the process and generates preferably some other evenly distributed, random pattern of the 9 values.

Other randomization schemes are possible, though, including using something conceptually similar to multiple decks of playing cards, or even a standard pseudo-random number generator to arrive at the deterministic sequence of delays.

The assignment of the range of latency values to messages may be on a system-wide basis, or per matching engine, or per account/participant, or per flow/connection. In some cases, it may be desirable not to have the latency distribution be entirely random or completely evenly spaced throughout the entire latency range. For example, it may be desirable to limit the number of consecutive lower valued latencies assigned, and/or the number of consecutive higher latencies assigned. The method within the QOS shaper 320 that assigns latencies may therefore attempt to distribute the latencies evenly within a relatively small set, such as ensuring that for every set of five consecutive latencies assigned to a participant response, at least two latencies in the set will be in a higher latency range and two other latencies will be in a lower latency range. For some applications, limiting the consecutive number of similar latencies (i.e., all high or all low) may be particularly desirable during particularly busy periods. For example, the periods surrounding market open and market close tend to exhibit higher levels of activity, as do periods following a news item that has a potential financial impact, such as an interest rate adjustment announcement. Such events might need a more tightly controlled distribution of latencies than during normal times.

The range of values selected should take into consideration the expected delays inherent in the components of the system, including at least the gateways 120 and the cores 140. For example, it may be that, depending on the message type and the current load on the distributed system, the time taken to process a message ranges between 400-800 nanoseconds, but the egress QOS shaper is configured to send any corresponding response at a randomized interval within a range of 1000 to 5000 nanoseconds. Accordingly, after the response message has reached the gateway node as it is being readied to be sent out to the trading participant, the message enters the egress QOS shaper, where it remains for a period of time until the precise randomized interval has elapsed since the original message was timestamped upon entry at the gateway node. Adding a randomized but evenly distributed jitter to the latency ensures fairness, since each trading message has an equal chance of being assigned any randomized jitter within the configured latency bounds, yet by adding jitter, the system mitigates against participant behaviors that could exploit the predictability of a perfectly consistent latency.

It should be understood that many of the concepts explained for fixed latency are also applicable to this embodiment. For example, it may be desirable to simultaneously send all related response messages that are triggered by a single incoming participant message. It may also be desirable to allow the set of QOS levels to be tuned, either on a per-participant/connection, or system-wide basis.

Figure 8:
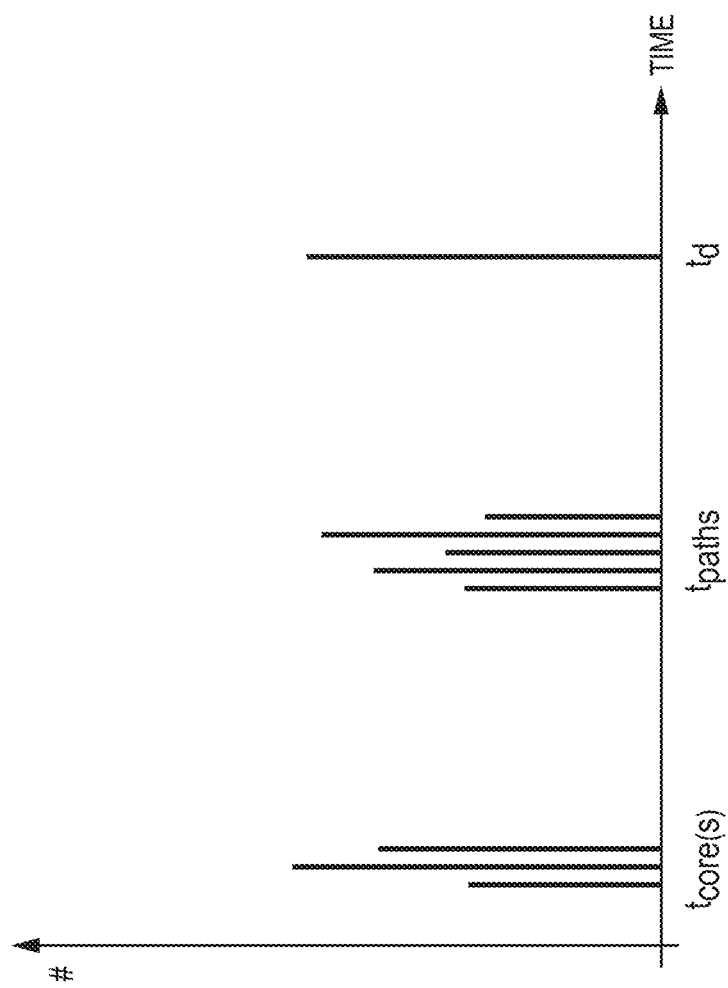
FIG. 8 shows how a fixed latency time can be selected.

FIG. 8 illustrates some of the considerations that may be factored into determining an appropriate fixed value for Td, which should be selected to be greater than a combination of the worst case delay through the cores 140 (Tcore) and the worst case delay (Tpath) of the paths between the gateways 120 and the cores 140 (for both inbound and outbound messages).

More particularly, for synchronous messages (that is, where the outbound message is a response to an inbound message) some of the considerations for determining Td may include:
  time in gateway ingress,
  transmission time between gateway to core,
  time in core,
  transmission time between core and gateway, or
  time in gateway egress.

Similarly, considerations for determining Td for asynchronous messages (those that are not a specific response to an inbound message) may include:
  time in core,
  transmission time between core and gateway, or
  time in gateway egress.

In an example embodiment, the cores 140 are expected to be largely implemented in hardware (e.g., they are fixed-logic, FPGA based) and thus have a relatively fixed predictable "time in core" to execute a task. However, it should be understood that some tasks executed by the cores 140 may take longer than others. For example a core 140 might respond to a Cancel request much faster than responding to an Add Order. A different Add Order request may require different times to process, depending upon whether the order is for a security that is frequently traded (and hence the required data to execute the trade is held in a cache local to a core 140 dedicated to that security) or infrequently traded (where the data necessary to execute the order is to be retrieved from a location outside of a local cache on the core 140). Thus, the types of messages expected to be sent may also factor into selecting Td.

The delays associated with the paths, Tpath is also expected to cluster around a relatively small and predictable value in an architecture that utilizes a fully connected mesh between all gateways 120 and cores 140, as described above.

Thus, Td should be chosen to be greater than the combination of these internal system delays, with the goal being that time Td is selected to "hide" the variability of things such as Tcore and Tpath from the market from the participant devices 130. As long as the worst-case scenario sets Td at or above some maximum possible system delay, it is possible for the system 100 to guarantee a deterministic latency for all participant devices 130.

Td can be determined at the time the system is designed. However, in another approach, Td can be dynamically tuned by monitoring the time difference between an inbound message and the associated outbound message, in order to guarantee Td will always be greater than the largest delta in time. In this mode, the system 100 can be placed in a special mode and subjected to a series of test request messages (different Add Orders, Cancels, etc.) and the response time noted for each of a set of participant connections, gateways, and cores, to determine a maximum latency time for the system.

Figure 9:
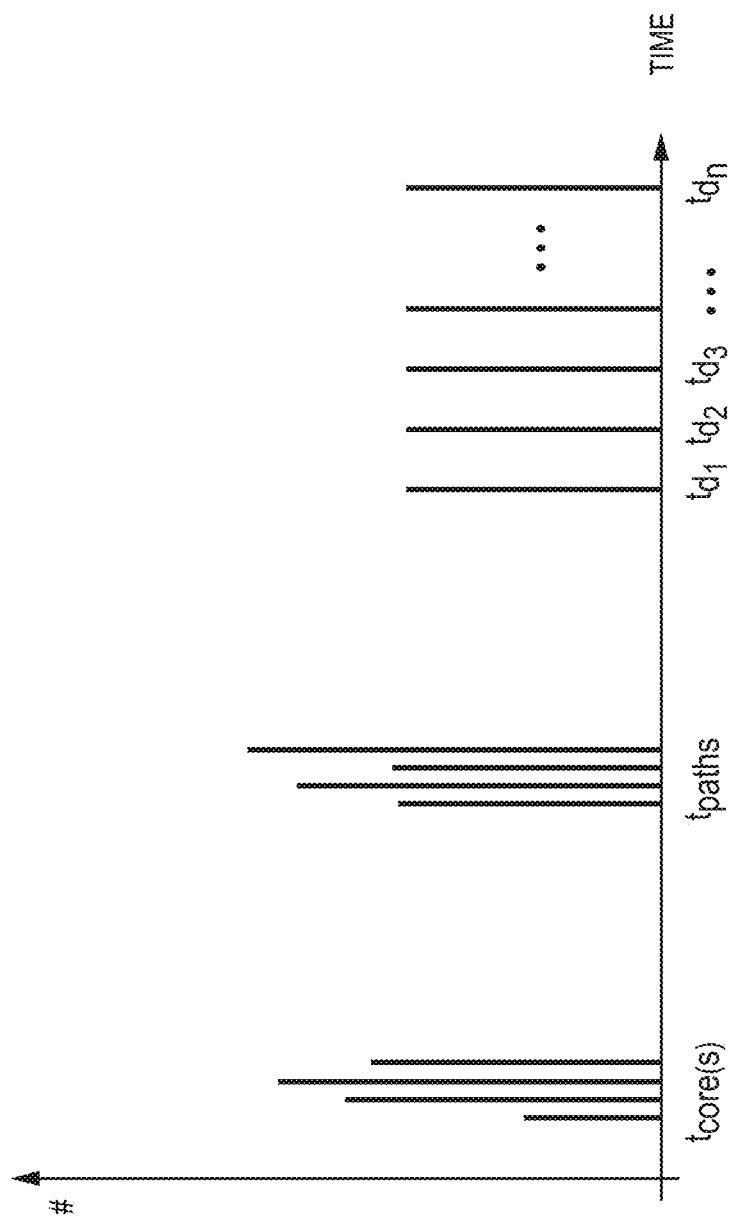
FIG. 9 shows how a set of fixed latency times can be selected across a range.

FIG. 9 is similar to FIG. 8 but illustrates the situation where the deterministic latency is evenly distributed across a range of values. In this example, there are multiple possible delay times Td1, Td2, Td3, ... Tdn. All of these times selected must be greater than the expected worst-case internal delay, e.g., the sum of Tcore and Tpath.

As mentioned above, some implementations of the system 100 may support participants that use different financial trading protocols. The processing of such messages is thus inherently faster or slower depending upon the protocol selected. For example, an inbound request message encoded using a binary protocol would inherently be handled by the cores 140 more rapidly than a request that uses a text-based protocol.

In order for such a system to provide deterministic, fair behavior for all participants, the latency should be the same regardless of the protocol used. Therefore, Td should be chosen to also accommodate such variance.

Figure 10:
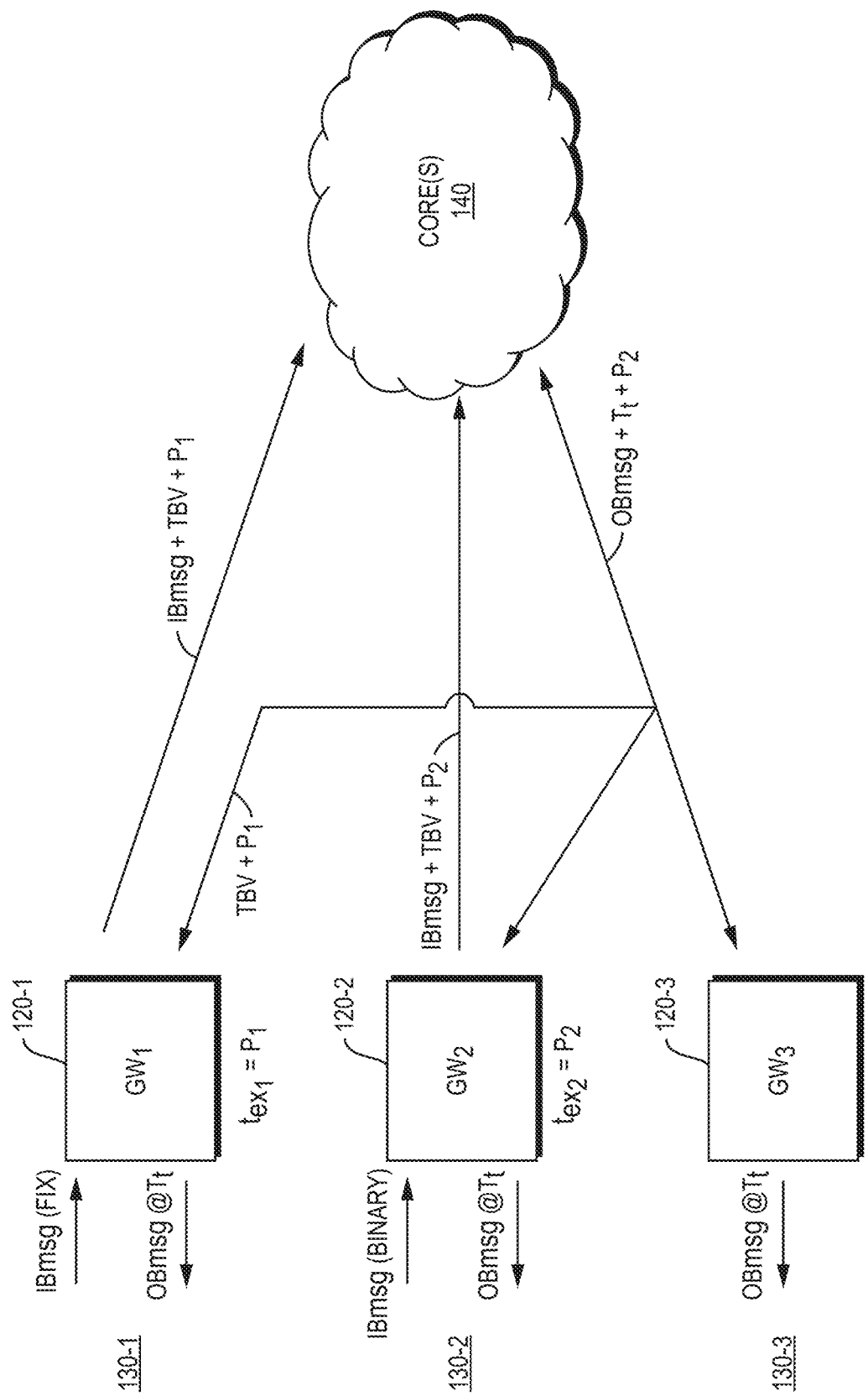
FIG. 10 is an example in which different participants experience varying deterministic latency based on an additional parameter, such as the financial trading protocol used.

In the example of FIG. 10, gateway 120-1 receives an IBmsg from a first participant 130-1 (for example, a buyer) that uses a text-based financial trading protocol. A different participant 130-2 (for example, a seller) may be using a binary financial trading protocol as it sends its IBmsgs to gateway 120-2. The time (P1) needed for the system to process the IBmsg for the first participant and return the corresponding response (OBmsg) may be longer than the time (P2) needed for the system to process the IBmsg and return the response for the second participant. Accordingly, while the system 100 could be configured with a time Td that is sufficiently high to take into account the processing time required for the slowest financial trading protocol, thereby ensuring that messages exchanged according to any protocol exhibit the same response time, as discussed above, alternatively, the system may instead be configured to treat different protocols differently, providing a message a deterministic time boost or a deterministic time penalty, depending on the message's protocol, thereby encouraging or discouraging the use of particular protocols.

By adjusting Td by a value that depends on a further parameter (e.g., P1 or P2) such as the financial trading protocol used (perhaps on a per-connection basis), the returned outbound message OBmsg will therefore be scheduled to finish exiting the system 100 at a time that depends upon both the protocol-dependent value as well as the time of receipt (e.g., the timestamp or TBV). Such IBmsgs will be forwarded to the cores with a protocol-dependent time value (P), which is carried along with the message and the TBV, so that the gateway can determine a time for the outbound message OBmsg to exit in a manner that takes into account the protocol of the message. In this manner, the gateways 120-1, 120-2 are able to calculate different egress times for market participants 130-1 and 130-2 to account for the message protocol they are using.

However, parameters such as P1 and P2 may be based on considerations other than the protocol in use. For example, they may be used to offer differentiated classes of service, where the participants who pay for "first class" service still are all delayed the same as other first class users, but they are not delayed as much as "second class" users who pay less, etc. The notion of the system 100 being "fair to participants with a deterministic latency" can thus mean different things. It can mean, "treat all participants exactly the same", or it can be used to incentivize certain types of trading behavior or protocols, or for security reasons.

The deterministic latency may also be temporarily adjusted based on current system conditions. For example, it may be increased due to failure of one or more components, or as a result of an exceptional burst of activity in the system.

Other Use Cases

The architecture described above may be of use in applications other than electronic trading systems. For example, it is possible that it may be used to monitor data streams flowing across a network, to capture packets, decode the packets' raw data, analyze packet content in real time, and provide responses, for applications other than handling securities trade orders.

Further Implementation Options

It should be understood that the example embodiments described above may be implemented in many different ways. In some instances, the various "data processors" may each be implemented by a physical or virtual general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., one or more central processing units, disks, various memories, input/output ports, network ports, etc.) that enables the transfer of information between the elements. One or more central processor units are attached to the system bus and provide for the execution of computer instructions. Also attached to system bus are typically I/O device interfaces for connecting the disks, memories, and various input and output devices. Network interface(s) allow connections to various other devices attached to a network. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The above description has particularly shown and described example embodiments. However, it will be understood by those skilled in the art that various changes in form and details may be made therein without departing from the legal scope of this patent as encompassed by the appended claims.

The invention claimed is:

1. A system comprising:
a plurality of gateways, connected to receive inbound messages from two or more participant devices;
one or more of the gateways each further configured to
determine a time based value (TBV) for a selected one of the inbound messages, the TBV depending on a time of arrival of the selected inbound message;
forward the selected inbound message with its respective TBV to one or more compute nodes;
receive a response message from the one or more compute nodes, the response message including the same TBV that was included in the selected inbound message;
determine a desired egress time that depends on an arithmetic combination of a deterministic latency and the TBV; and
send a reply message that depends on the response message to at least one of the participant devices as an outbound message, the outbound message sent at the desired egress time.

2. The system of claim 1 wherein the TBV comprises a timestamp that corresponds to a receive time for the selected inbound message, and the desired egress time is determined after the response message is received from the one or more compute nodes.

3. The system of claim 1 wherein the TBV comprises the desired egress time for the reply message, and the desired egress time is determined before the selected inbound message is forwarded to the one or more compute nodes.

4. The system of claim 1 additionally comprising:
a packet scheduler, configured to receive the response message, the packet scheduler comprising a set of indexed locations, each associated with a desired egress time; and
wherein the TBV is a value that depends on a value of an indexed location associated with the desired egress time.

5. The system of claim 1 wherein the TBV is inserted into an unused field in the selected inbound message before being forwarded to the one or more compute nodes.

6. The system of claim 1 wherein the TBV is added as part of an internal system protocol field within the selected inbound message.

7. The system of claim 1 wherein the deterministic latency depends on a maximum time for the one or more of the gateways to receive the response message from the one or more compute nodes.

8. The system of claim 1 wherein the deterministic latency follows a varying but deterministic pattern.

9. The system of claim 1 wherein the deterministic latency is selected from a set of latencies evenly distributed across a predetermined range.

10. The system of claim 1 wherein the deterministic latency is configured on a per gateway, per-connection, or system-wide basis.

11. The system of claim 1 wherein the deterministic latency is dynamically changed due to system conditions.

12. The system of claim 1 wherein two or more of the gateways each receive the response message from the one or more compute nodes.

13. The system of claim 1 additionally wherein
the selected inbound message is forwarded to the one or more compute nodes and the response message is received from the one or more compute nodes via a plurality of direct connections provided between each of the one or more gateways and each of the one or more compute nodes.

14. The system of claim 1 wherein the response message is associated with a trade match event between two match parties each associated with a respective one of two participant devices, and where the gateways are further configured to
send the reply message as an outbound message at the desired egress time simultaneously to the two participant devices.

15. The system of claim 14 wherein the outbound message is also sent simultaneously at the desired egress time as a market data event message to a device associated with a subscriber of a market data stream.

16. The system of claim 1 wherein the one or more gateways are further configured to
receive an asynchronous message from at least one of the one or more compute nodes, and send the asynchronous message as an outbound message to two or more participant devices.

17. The system of claim 1 wherein the TBV further depends on a time value related to one or more of a message path delay or compute node delay.

18. The system of claim 1 wherein the one or more gateways are further configured to
forward the selected inbound message with its respective TBV to one or more sequencer nodes.

19. The system of claim 1 additionally wherein:
the one or more compute nodes are configured to receive the selected inbound message with its respective TBV from the one or more gateways; and
the one or more compute nodes are also configured to return the response message with the TBV to the one or more gateways.

20. The system of claim 1 wherein
the one or more gateways are further configured to forward the selected inbound message with its respective TBV to one or more sequencer nodes; and
the one or more sequencer nodes are configured to forward the selected inbound message with its respective TBV as a sequence-marked message to the one or more compute nodes.

21. The system of claim 20 wherein the one or more compute nodes are further configured to
determine the response message based on either one of or both of the selected inbound message or the sequence-marked message.

22. The system of claim 1 wherein
the selected inbound message is related to an electronic trade matching function; and
the response message is configured to complete the electronic trade matching function.

23. The system of claim 1 wherein the one or more of the gateways are further configured to:
translate the selected inbound message into a normalized message format used for subsequent communication among the one or more of the gateways and the one or more compute nodes.

24. A method to transmit a response message from an electronic device with a deterministic latency, the method comprising:
receiving an incoming message from a participant device;
determining a time based value (TBV) for the incoming message, the TBV depending on a time of arrival of the incoming message;
sending a forwarded message to one or more compute engines, the forwarded message including the incoming message and the TBV;
receiving a compute-response message from the one or more compute engines, the compute-response message including the same TBV that was included in the forwarded message;
determining a desired egress time that depends on an arithmetic combination of the TBV and the deterministic latency;
and
transmitting a reply message that depends on the compute-response message to the participant device at the desired egress time.

25. A method to transmit a response message from an electronic device with a deterministic latency, the method comprising:
receiving an incoming message from a participant device;
determining a time based value (TBV) for the incoming message, the TBV depending on an arithmetic combination of a time of arrival of the incoming message and the deterministic latency;
sending a forwarded message to one or more compute engines, the forwarded message including the incoming message and the TBV;
receiving a compute-response message from the one or more compute engines, the compute-response message including the same TBV that was included in the forwarded message;
determining a desired egress time that depends on the TBV; and
transmitting a reply message that depends on the compute-response message to the participant device at the desired egress time.

* * * * *